US012678992B2

(12) United States Patent
Frank et al.

(10) Patent No.: US 12,678,992 B2
(45) Date of Patent: Jul. 14, 2026

(54) BEVEL SAWS AND METHODS OF ADJUSTING A FENCE OF A BEVEL SAW

(71) Applicant: Festool GmbH, Wendlingen (DE)

(72) Inventors: Josua Frank, Urbach (DE); Christian Schock, Schorndorf (DE); Andreas Sdrzallek, Zahrádky (CZ); Felix Brennenstuhl, Tuebingen (DE); Benjamin Brehm, Tuttlingen (DE)

(73) Assignee: Festool GmbH, Wendlingen (DE)

( * ) Notice: Subject to any disclaimer, the term of this patent is extended or adjusted under 35 U.S.C. 154(b) by 201 days.

(21) Appl. No.: 18/466,080

(22) Filed: Sep. 13, 2023

(65) Prior Publication Data

US 2024/0091977 A1 Mar. 21, 2024

(30) Foreign Application Priority Data

Sep. 15, 2022 (EP) .................................... 22195857

(51) Int. Cl.
*B27B 27/10* (2006.01)
*B27B 5/24* (2006.01)
*B27B 27/06* (2006.01)

(52) U.S. Cl.
CPC ................ *B27B 27/10* (2013.01); *B27B 5/24* (2013.01); *B27B 27/06* (2013.01)

(58) Field of Classification Search
CPC ............. Y10T 83/7697; Y10T 83/7701; Y10T 83/7693; Y10T 83/7705; Y10T 83/8779;
(Continued)

(56) References Cited

U.S. PATENT DOCUMENTS 5,251,142 A * 10/1993 Cramer ................... B27B 27/08
83/76.8
9,833,924 B2 * 12/2017 Gehret ................. B23D 59/005
(Continued)

FOREIGN PATENT DOCUMENTS

EP 1 000 717 5/2000
EP 1 738 850 1/2007
(Continued)

OTHER PUBLICATIONS

Extended European Search Report date Feb. 20, 2023, in European Patent Application No. 22195857.2, 7 pages.
(Continued)

*Primary Examiner* — Phong H Nguyen
(74) *Attorney, Agent, or Firm* — Grüneberg Global IP, PLLC

(57) ABSTRACT

Bevel saws and methods of adjusting a fence of a bevel saw are disclosed herein. The bevel saws include a workpiece support that defines a workpiece support surface. The bevel saws also include a user-actuated assembly and an assembly attachment structure that operatively attaches the user-actuated assembly to the workpiece support. The assembly attachment structure includes a blade bevel angle adjustment mechanism configured to adjust a blade bevel angle of the bevel saw blade. The bevel saws also include a fence that defines a fence surface that extends away from the workpiece support surface. The fence includes a first fence region and a second fence region. The first fence region and the second fence region define a blade-receiving gap therebetween, and the fence further includes a gap adjustment mechanism configured to automatically adjust the blade-receiving gap based, at least in part, on the blade bevel angle.

34 Claims, 16 Drawing Sheets

(58) Field of Classification Search
CPC ......... B27B 27/10; B27B 27/06; B27B 27/00; B27B 27/04; B27B 27/08; B27B 5/24
See application file for complete search history.

(56) References Cited

U.S. PATENT DOCUMENTS

| | | | | |
|---|---|---|---|---|
| 2001/0000856 | A1* | 5/2001 | O'Banion | B27B 27/02 83/581 |
| 2006/0288836 | A1* | 12/2006 | Wang | B23D 59/001 83/438 |
| 2009/0028236 | A1* | 1/2009 | Zhou | H02P 8/42 375/239 |

FOREIGN PATENT DOCUMENTS

| | | |
|---|---|---|
| EP | 1 995 654 | 11/2008 |
| EP | 2 156 930 A2 | 2/2010 |
| EP | 2 156 930 A3 | 7/2011 |

OTHER PUBLICATIONS

Office Action issued in Chinese Patent Application No. 202311186899.6 on Feb. 13, 2026 with English translation, 21 pages.

* cited by examiner

BEVEL SAWS AND METHODS OF ADJUSTING A FENCE OF A BEVEL SAW

CROSS-REFERENCE TO RELATED APPLICATIONS

This application claims priority to European Application No, 22195857.2 filed on Sep. 15, 2022, the content of which is hereby incorporated by reference in its entirety.

BACKGROUND OF THE INVENTION

Field of the Invention

The present disclosure relates generally to bevel saws and to methods of adjusting a fence of a bevel saw.

Description of Related Art

Bevel saws may be utilized to form a bevel cut within a workpiece utilizing a bevel saw blade. Bevel saws often utilize a table and an attached fence to support the workpiece relative to the bevel saw blade. The fence may extend on two sides of the bevel saw blade such that the fence supports the workpiece on the two sides of the blade. Such fences generally define a blade-receiving gap, which is configured to receive the bevel saw blade, thereby permitting the bevel saw blade to cut entirely through the workpiece. In order to facilitate formation of bevel cuts with a variety of different bevel angles, the blade-receiving gap may be relatively wide when compared to a thickness of the circular saw blade. In some bevel saws, the fence may be configured to permit limited manual adjustment of the blade-receiving gap. However, such adjustments are cumbersome, and bevel saw users typically do not make this adjustment, thereby decreasing a cut quality of the bevel saw and/or increasing a potential for jamming of the bevel saw blade by the workpiece. Thus, there exists a need for improved bevel saws and/or for improved methods of adjusting a fence of a bevel saw.

SUMMARY OF THE INVENTION

Bevel saws and methods of adjusting a fence of a bevel saw are disclosed herein. The bevel saws include a workpiece support that defines a workpiece support surface configured to support a first side of a workpiece. The bevel saws also include a user-actuated assembly that includes a motor and an arbor. The motor includes a motor shaft configured to rotate about a shaft rotational axis, and the arbor is operatively attached to the motor shaft and configured to receive a bevel saw blade. The bevel saws further include an assembly attachment structure that operatively attaches the user-actuated assembly to the workpiece support and is configured to permit constrained motion of the user-actuated assembly relative to the workpiece support surface and/or relative to the fence. The assembly attachment structure includes a blade bevel angle adjustment mechanism configured to adjust a blade bevel angle of the bevel saw blade relative to the workpiece support surface. The bevel saws also include a fence that defines a fence surface that extends away from the workpiece support surface and is configured to support a second side of the workpiece. The fence includes a first fence region and a second fence region. The first fence region and the second fence region define a blade-receiving gap therebetween. The blade-receiving gap is configured to receive the bevel saw blade during operative use of the bevel saw to form the bevel cut in the workpiece, and the fence further includes a gap adjustment mechanism configured to automatically adjust the blade-receiving gap based, at least in part, on the blade bevel angle.

In an example, a bevel saw blade is attached to the arbor and/or driven by the arbor.

The methods include changing at least one of a blade bevel angle of the bevel saw and a blade miter angle of the bevel saw. The methods also include automatically adjusting a blade-receiving gap of the fence based, at least in part, on the changing.

DETAILED DESCRIPTION AND BEST MODE OF THE DISCLOSURE

Figure 1:
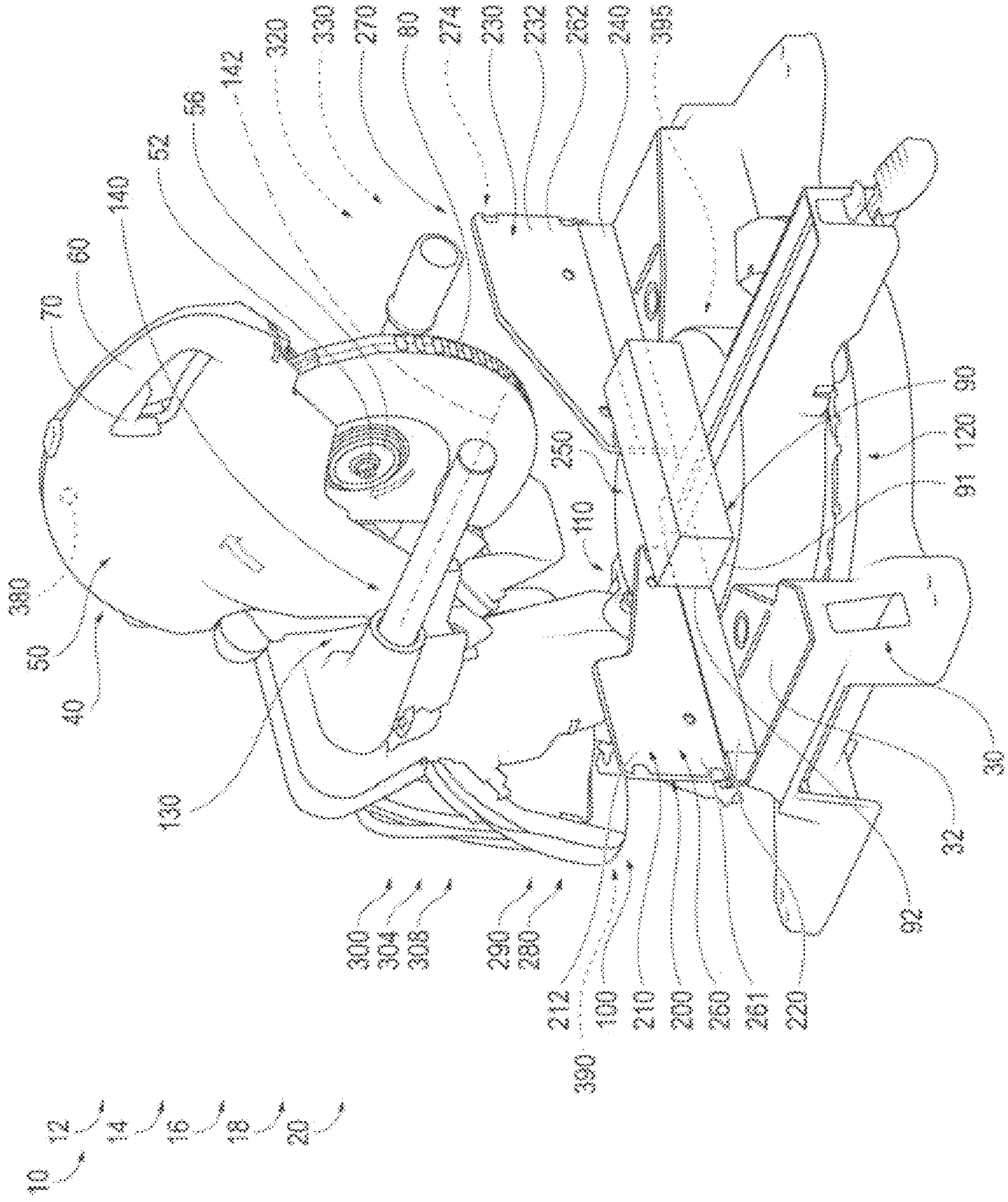
FIG. 1 is an illustration of examples of bevel saws, according to the present disclosure, in a cross cut configuration.

FIGS. 1-17 provide examples of bevel saws 10, of components of bevel saws 10, and/or of methods 500 of adjusting a fence of a bevel saw, according to the present disclosure. Elements that serve a similar, or at least substantially similar, purpose are labeled with like numbers in each of FIGS. 1-17, and these elements may not be discussed in detail herein with reference to each of FIGS. 1-17. Similarly, all elements may not be labeled in each of FIGS. 1-17, but reference numerals associated therewith may be utilized herein for consistency, Elements, components, and/or features that are discussed herein with reference to one or more of FIGS. 1-17 may be included in and/or utilized with any of FIGS. 1-17 without departing from the scope of the present disclosure. In general, elements that are likely to be included in a particular embodiment are illustrated in solid lines, while elements that are optional are illustrated in dashed lines. However, elements that are shown in solid lines may not be essential to all embodiment and, in some embodiments, may be omitted without departing from the scope of the present disclosure.

FIGS. 1-16 illustrate examples of bevel saws 10 and/or of components of bevel saws 10, according to the present disclosure. Bevel saws 10 may be configured to form and/or to define a cross cut, a bevel cut, a miter cut, and/or a compound cut in a workpiece 90.

In the following discussion, references are made to various cuts that may be made to workpieces 90 with bevel saws 10 according to the present disclosure. For illustrative purposes, these cuts are described in the context of a workpiece 90 that is a rectangular prism, namely, in which all faces are rectangles and in which intersecting faces extend perpendicular to each other.

As used herein, "cross cut" refers to a cut, within workpiece 90 and via bevel saw 10, in which faces of the workpiece that are exposed during formation of the cross cut extend perpendicular to all surfaces of workpiece 90 from which the faces extend. As an example, the configuration that is illustrated in FIGS. 1-2, 4, 7, 9, 13, and 16 may be utilized to form the cross cut within the workpiece and may be referred to herein as the cross cut configuration of bevel saw 10.

As used herein, "bevel cut" refers to a cut, within workpiece 90 and via bevel saw 10, in which faces of the workpiece that are exposed during formation of the bevel cut extend perpendicular to a front surface and/or to a rear surface of the workpiece but extend at an angle that differs from 90 degrees along a top surface and/or a bottom surface of the workpiece. As an example, the configuration that is illustrated in FIGS. 3, 6, 8, 10, 13, and 15 may be utilized to form the bevel cut within the workpiece, with the bevel cut extending perpendicular to front and rear surfaces of workpiece 90 (e.g., perpendicular to a second side 92 of the workpiece) and extending at a blade bevel angle 112 that differs from 90 degrees relative to top and bottom surfaces of the workpiece (e.g., relative to a first side 91 of the workpiece, as perhaps best illustrated in FIG. 3. Such a configuration may be referred to herein as the bevel cut configuration of bevel saw 10.

As used herein, "miter cut" and "mitre cut" refer to a cut, within workpiece 90 and via bevel saw 10, in which faces of the workpiece that are exposed during formation of the miter cut extend perpendicular to the top surface and/or to the bottom surface of the workpiece but extend at an angle that differs from 90 degrees along the front surface and/or the rear surface of the workpiece. As an example, the configuration that is illustrated in FIGS. 5, 7, 9, 14, and 16 may be utilized to form the miter cut within the workpiece, with the miter cut extending perpendicular to top and bottom surfaces of workpiece 90 (e.g., perpendicular to first side 91 of the workpiece) and extending at a blade miter angle 122 that differs from 90 degrees relative to front and rear surfaces of the workpiece (e.g., relative to second side 92 of the workpiece, as perhaps best illustrated in FIG. 5). Such a configuration may be referred to herein as the miter cut configuration of bevel saw 10.

As used herein, "compound cut" refers to a cut, within workpiece 90 and via bevel saw 10, in which faces of the workpiece that are exposed during formation of the compound cut extend at an angle that differs from 90 degrees along the top surface, along the bottom surface, along the front surface, and along the rear surface of the workpiece. Stated differently, in a compound cut, blade bevel angle 112 and blade miter angle 122 both differ from 90 degrees. Such a configuration may be referred to herein as the compound cut configuration of bevel saw 10, and FIGS. 3, 6, 8, 10, 13, and 15 illustrate examples of configurations that may be utilized to form the compound cut in the workpiece.

As known to those of ordinary skill in the art, workpieces with other shapes may be utilized, and the shape of the workpiece may impact the orientation of a particular formed face with respect to a particular surface of the workpiece. With this in mind, and as used herein, the phrase "cross cut" additionally or alternatively refers to a cut in which blade bevel angle 112 and blade miter angle 122 both are equal to 90 degrees. In addition, the phrase "bevel cut" additionally or alternatively refers to a cut in which blade bevel angle 112 differs from 90 degrees while blade miter angle 122 is equal to 90 degrees. Similarly, the phrase "miter cut" additionally or alternatively refers to a cut in which blade miter angle 122 differs from 90 degrees while blade bevel angle 112 is equal to 90 degrees. In addition, the phrase "compound cut" additionally or alternatively refers to a cut in which blade bevel angle 112 and blade miter angle 122 both differ from 90 degrees.

As also known to those of ordinary skill in the art, it may be time-consuming and/or unnecessary to set various surfaces and/or angles of bevel saws 10 exactly equal to a corresponding value and/or orientation. With this in mind, it is to be understood that a given angle, or orientation, may differ from "parallel," may differ from "perpendicular," and/or may differ from a specified angular value by less than a threshold angular variation and still may be considered to be "parallel," "perpendicular," and/or equal to the specified angular value within the context of the instant disclosure. Examples of the threshold angular variation include variations of less than 5 degrees, less than 4 degrees, less than 3 degrees, less than 2 degrees, less than 1 degree, less than 0.5 degrees, less than 0.25 degrees, or less than 0.1 degree.

As generally illustrated in FIGS. 1-16, and with more specific reference to FIGS. 1-5, bevel saws 10 include a workpiece support 30 that defines a support surface 32, which is configured to support first side 91 of workpiece 90. As perhaps best illustrated in FIGS. 2-3, blade bevel angle 112 may be defined between support surface 32 and a bevel saw blade 80 of bevel saws 10. Bevel saws 10 also include a user-actuated assembly 40 that includes a motor 50 and an arbor 56. Motor 50 includes a motor shaft 52 that is configured to rotate about a shaft rotational axis 54. Arbor 56 is operatively attached to motor shaft 52 and is configured to receive bevel saw blade 80, to operatively interconnect the bevel saw blade with the motor shaft, and/or to rotate the bevel saw blade responsive to rotation of the motor shaft.

Bevel saws 10 also include an assembly attachment structure 100, which operatively attaches user-actuated assembly 40 to workpiece support 30. Assembly attachment structure 100 is configured to permit constrained motion of user-actuated assembly 40 relative to workpiece support surface 32, such as to permit and/or to facilitate cutting of the workpiece by the bevel saw. Assembly attachment structure 100 includes a blade bevel angle adjustment mechanism 110, which is configured to adjust, or to permit adjustment of, blade bevel angle 112 of bevel saw blade 80 relative to workpiece support surface 32.

Bevel saws 10 also include a fence 200. Fence 200 defines a fence surface 260 that extends away from workpiece support surface 32 and/or that is configured to support second side 92 of workpiece 90. Fence 200 includes a first fence region 210 and a second fence region 230. First fence region 210 and second fence region 230 define a blade-receiving gap 250 therebetween. Blade-receiving gap 250 is configured to receive bevel saw blade 80 during operative use of bevel saw 10 to cut the workpiece and/or to form the bevel cut in the workpiece.

Fence 200 also includes a gap adjustment mechanism 270. Gap adjustment mechanism 270 is configured to automatically adjust, change, and/or modify blade-receiving gap 250 based, at least in part, on blade bevel angle 112, responsive to a change in blade bevel angle 112, and/or such that blade-receiving gap 250, or a shape of blade-receiving gap 250, corresponds to and/or is based upon blade bevel angle 112.

Figure 2:
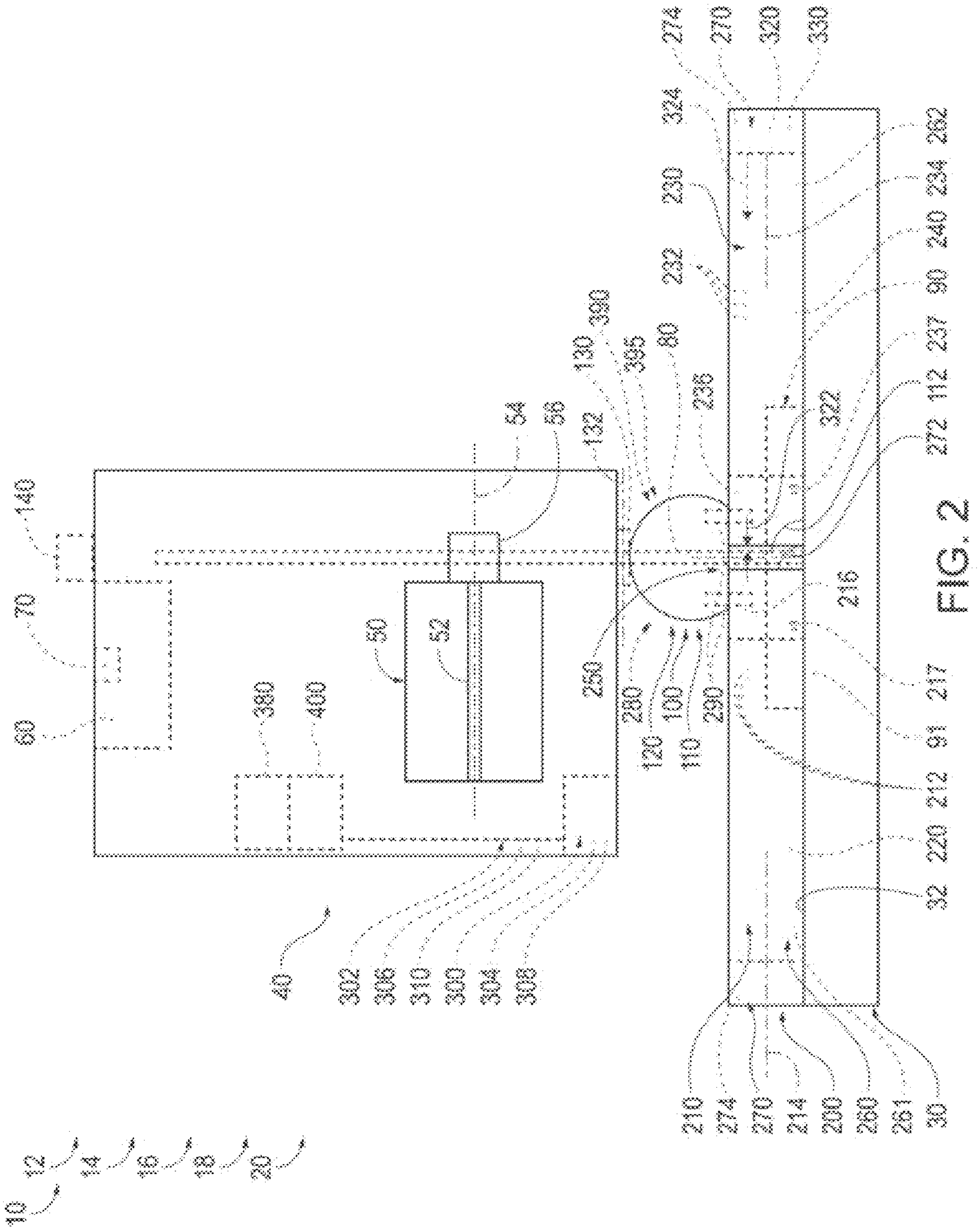
FIG. 2 is a schematic front view of examples of bevel saws, according to the present disclosure, in the cross cut configuration.
Figure 3:
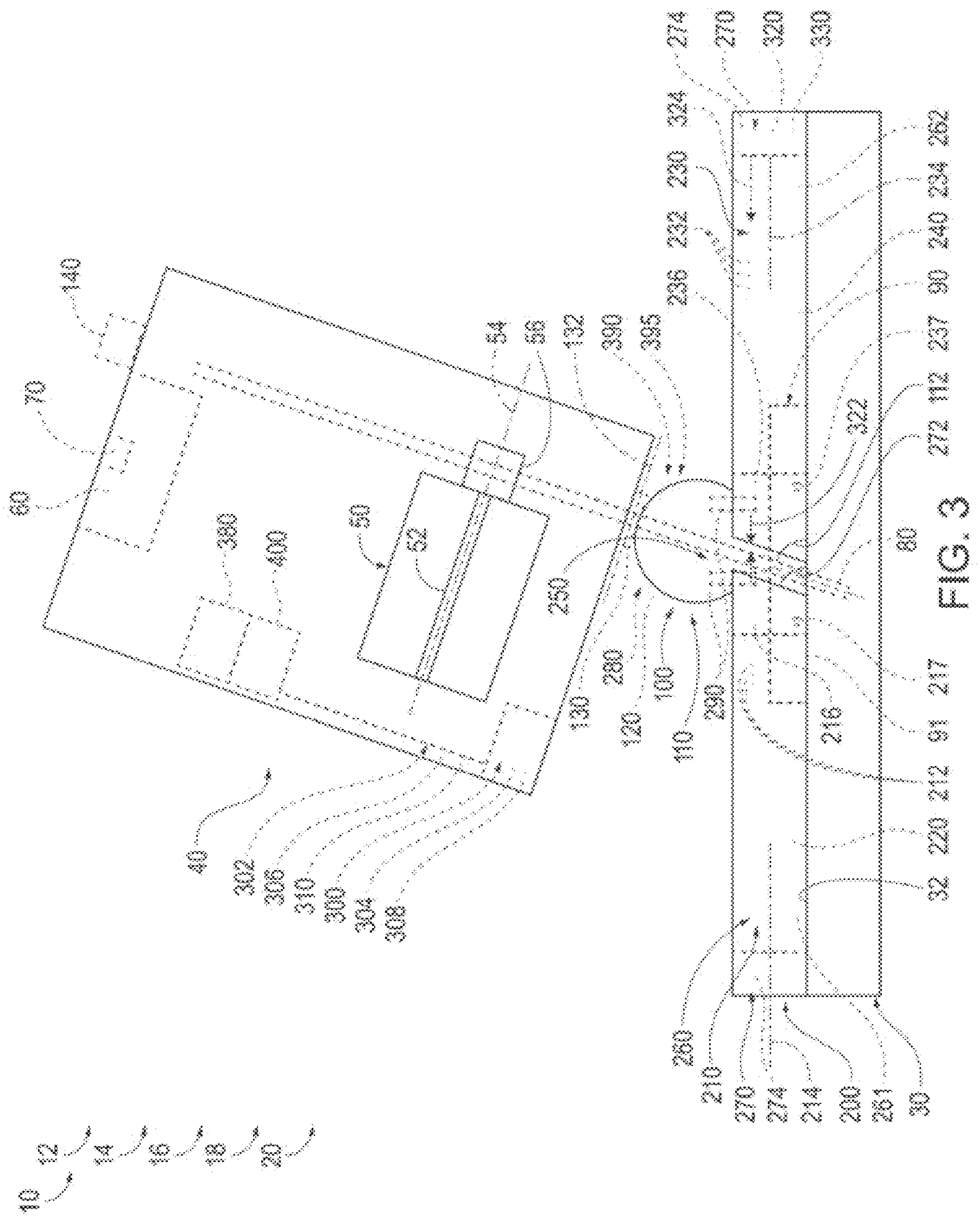
FIG. 3 is a schematic front view of examples of bevel saws, according to the present disclosure, in a bevel cut configuration.
Figure 4:
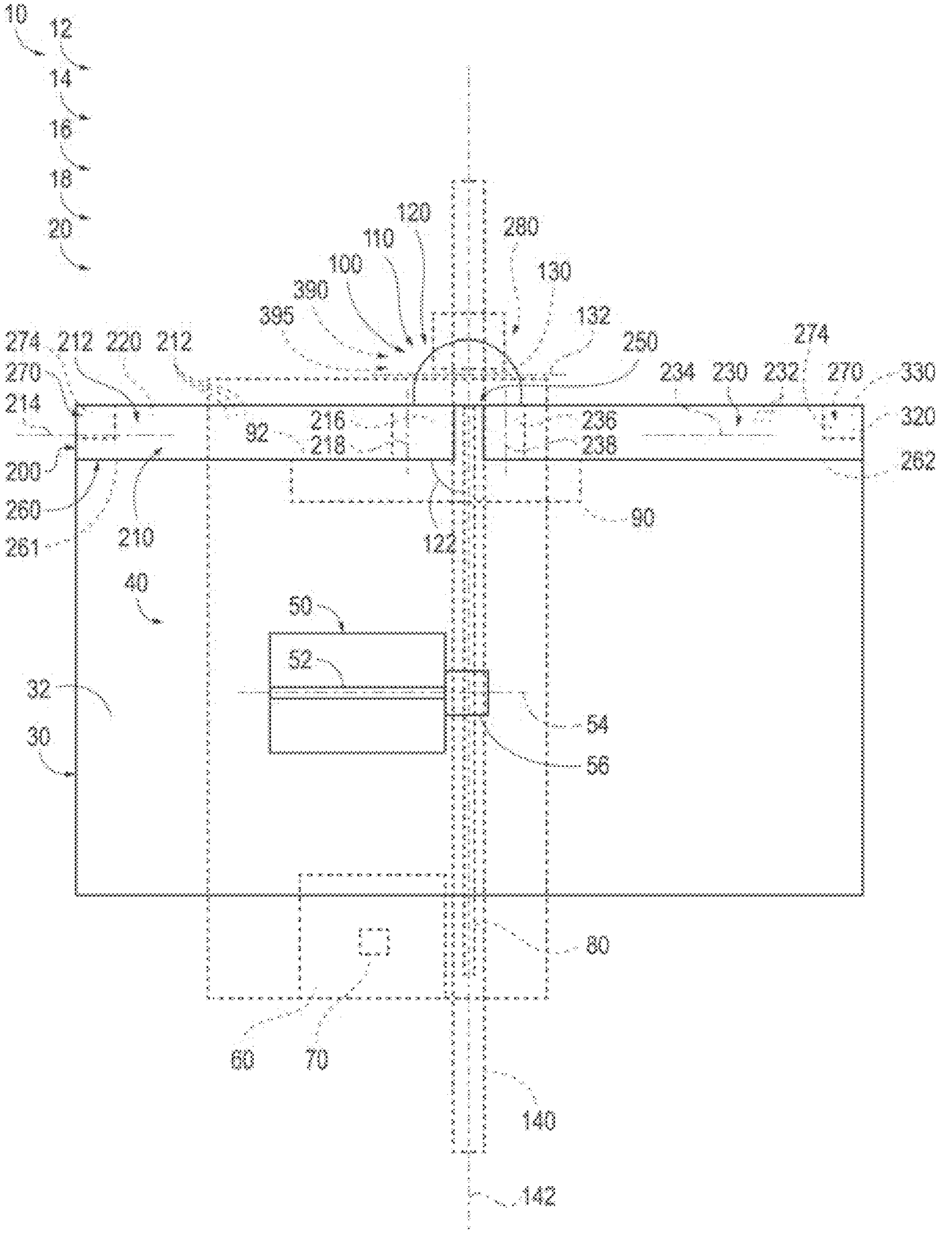
FIG. 4 is a schematic top view of examples of bevel saws, according to the present disclosure, in the cross cut configuration.
Figure 5:
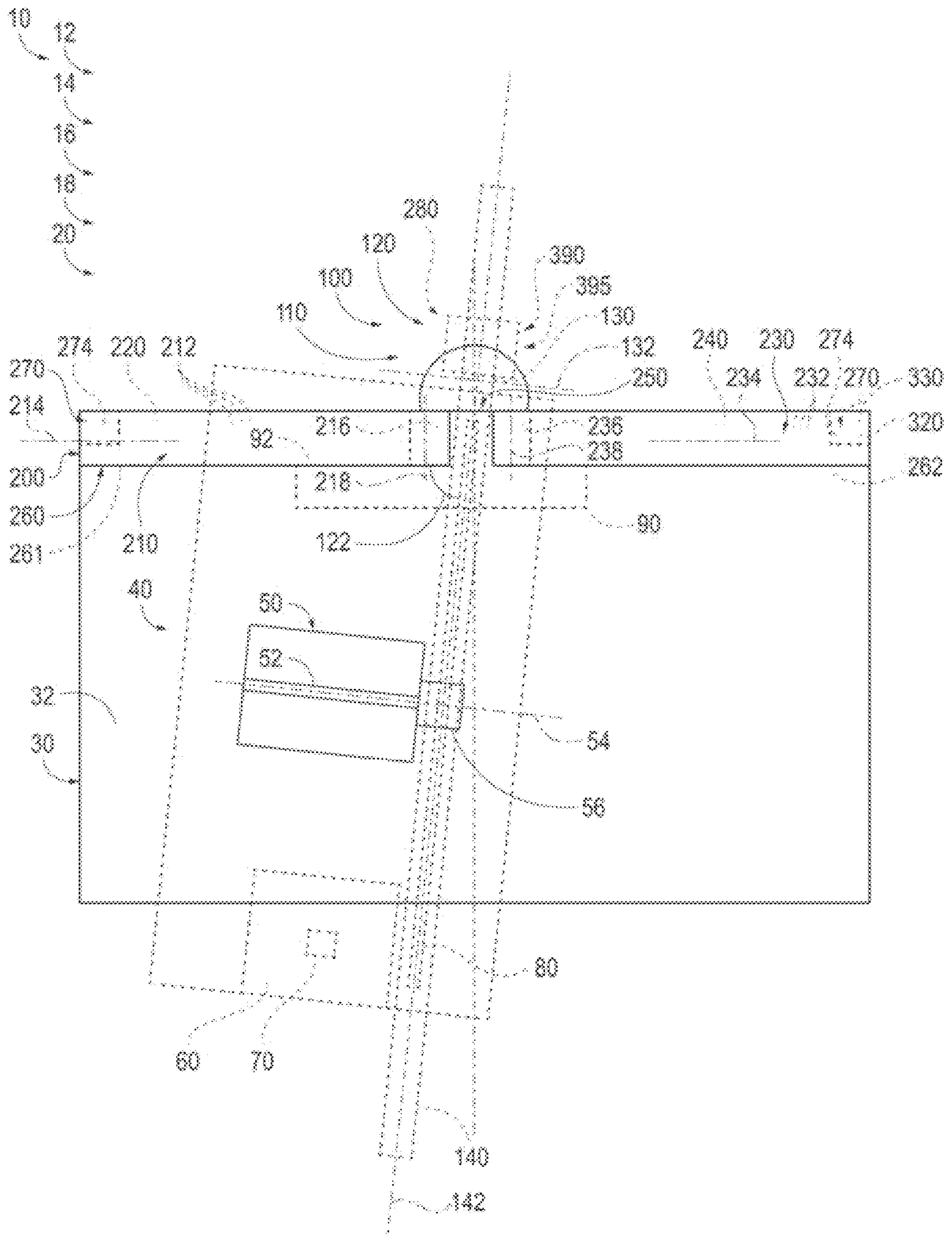
FIG. 5 is a schematic top view of examples of bevel saws, according to the present disclosure, in a miter cut configuration.

During operation of bevel saws 10, and as discussed in more detail herein, blade bevel angle adjustment mechanism 110 may be utilized to change, to adjust, and/or to modify blade bevel angle 112, such as to permit and/or to facilitate formation of a desired bevel cut within workpiece 90. As perhaps best illustrated by the transition between the configuration that is illustrated in FIG. 2 to the configuration that is illustrated in FIG. 3, changes in bevel angle 112 may cause a significant change in the position of bevel saw blade 80 relative to fence 200 and/or relative to blade-receiving gap 250. As discussed, and in conventional bevel saws, a corresponding conventional blade-receiving gap 250 may be quite wide in order to ensure that bevel saw blade 80 does not contact the fence, or is spaced-apart from the fence by at least a threshold distance, as the bevel saw blade is moved throughout a permissible range of corresponding blade bevel angles and/or blade miter angles. While such a configuration may be effective at avoiding contact between the bevel saw blade and the fence, it may increase a potential for damage to the workpiece and/or binding and/or jamming of the bevel saw by and/or with the workpiece. With this in mind, bevel saws 10 that include fences 200 with gap adjustment mechanisms 270, according to the present disclosure, automatically adjust blade-receiving gap 250 based upon blade bevel angle 112 and/or responsive to changes in the blade bevel angle. This is schematically illustrated by the change from the configuration of blade-receiving gap 250 that is illustrated in FIG. 2 to the configuration of blade-receiving gap 250 that is illustrated in FIG. 3.

This adjustment may be performed in any suitable manner and with any suitable structure, as discussed in more detail herein. As an example, fences 200 and/or gap adjustment mechanisms 270 may be configured to adjust blade-receiving gap 250 concurrently with adjustment of blade bevel angle 112 and/or responsive to adjustment of blade bevel angle 112. As another example, fences 200 and/or gap adjustment mechanisms 270 may be configured to adjust blade-receiving gap 250 prior to and/or subsequent to adjustment of blade bevel angle 112. In some such examples, adjustment of blade-receiving gap 250 may be responsive to receipt of a user input. As yet another example, fences 200 and/or gap adjustment mechanisms 270 may be configured to mechanically adjust blade-receiving gap 250. As another example, fences 200 and/or gap adjustment mechanisms 270 may be configured to electrically adjust blade-receiving gap 250. Specific examples of gap adjustment mechanisms 270 are discussed in more detail herein.

It is within the scope of the present disclosure that gap adjustment mechanism 270 may be configured to adjust blade-receiving gap in any suitable manner and with any suitable structure. As an example, gap adjustment mechanism 270 may be configured to adjust the blade-receiving gap, a shape of the blade-receiving gap, and/or an opening into the blade-receiving gap within a bevel angle plane, which may extend parallel to or within fence surface 260. Additionally or alternatively, the bevel angle plane may extend perpendicular to workpiece support surface 32.

Figure 6:
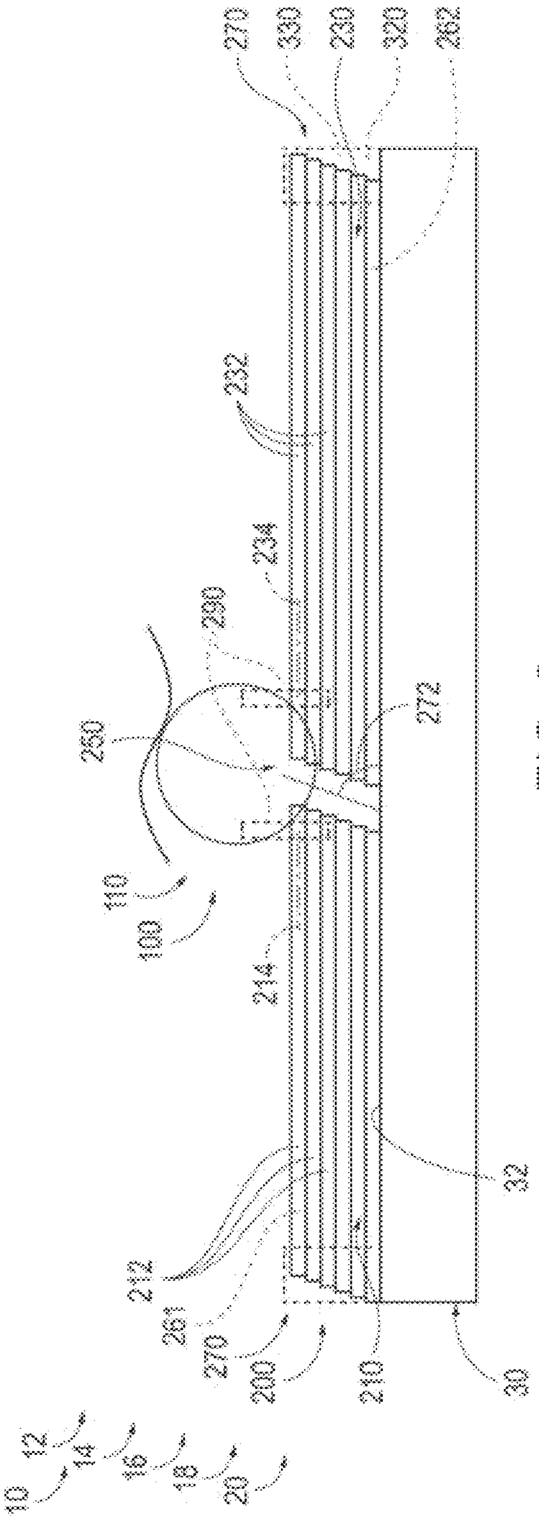
FIG. 6 is a schematic front view of examples of a fence of a bevel saw, according to the present disclosure, in the bevel cut configuration and/or in a compound cut configuration.
Figure 7:
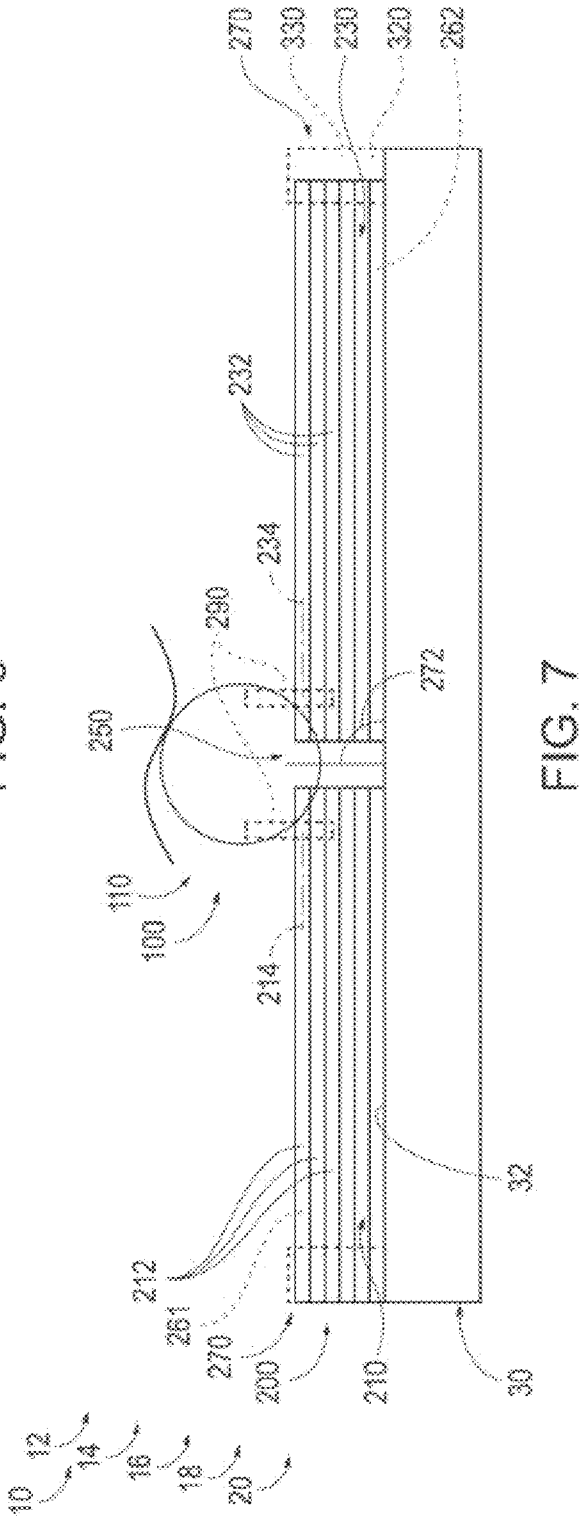
FIG. 7 is a schematic front view of examples of a fence of a bevel saw, according to the present disclosure, in the cross cut configuration and/or in the miter cut configuration.
Figure 8:
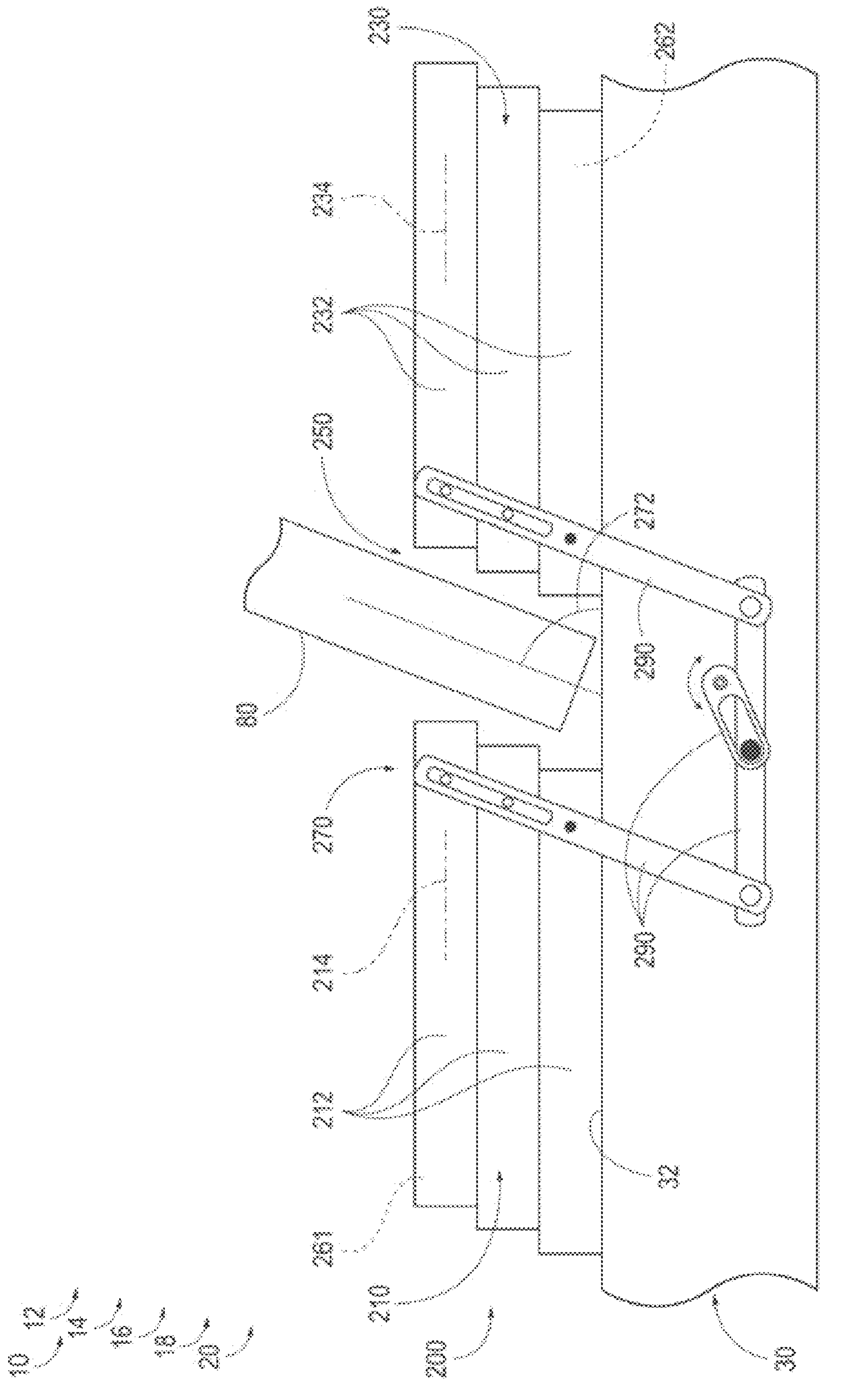
FIG. 8 is a less schematic rear view of examples of a fence of a bevel saw, according to the present disclosure, in the bevel cut configuration and/or in the compound cut configuration.
Figure 9:
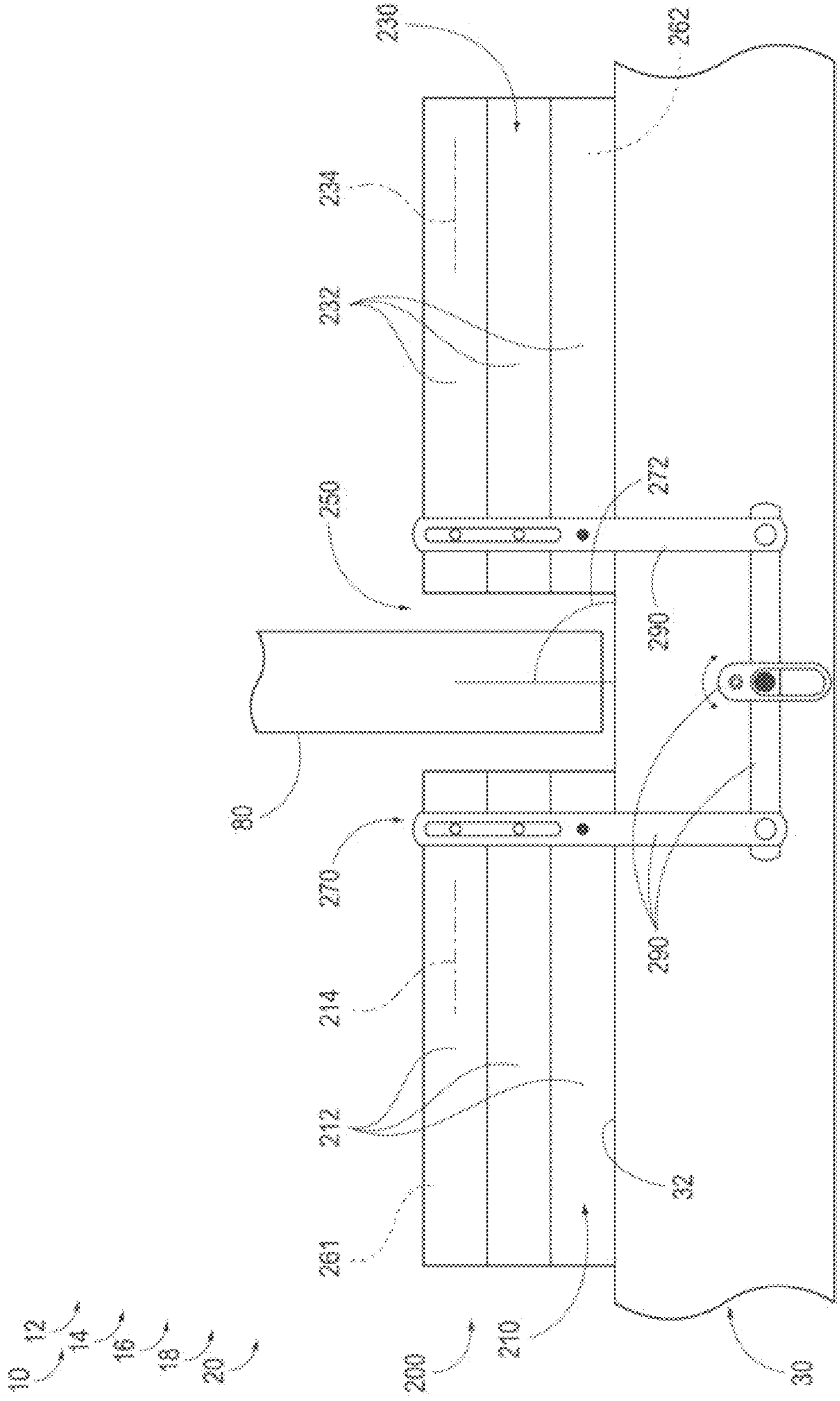
FIG. 9 is a less schematic rear view of examples of a fence of a bevel saw, according to the present disclosure, in the cross cut configuration and/or in the miter cut configuration.
Figure 13:
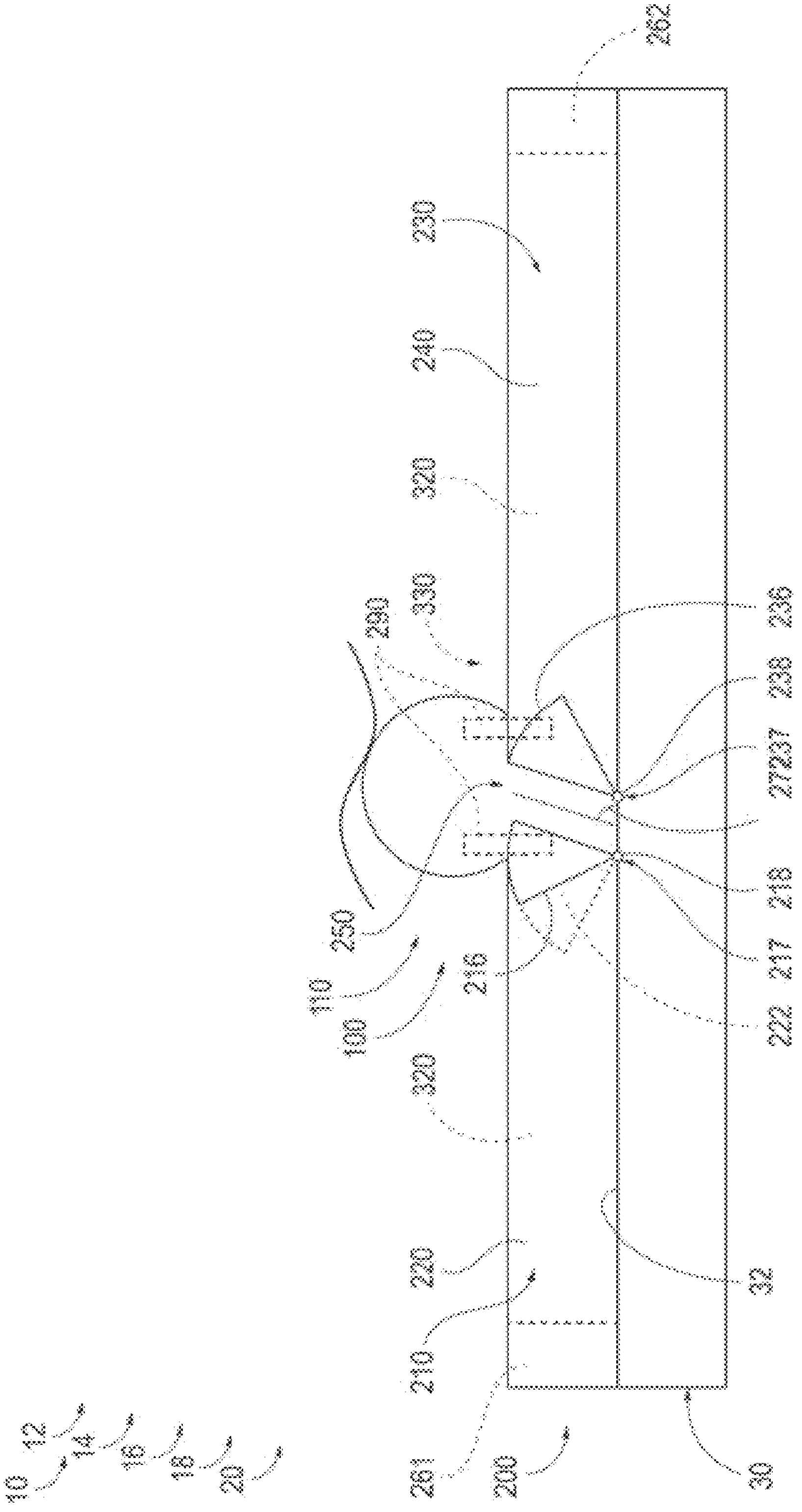
FIG. 13 is a schematic front view of examples of a fence of a bevel saw, according to the present disclosure, in the bevel cut configuration and/or in the compound cut configuration.
Figure 14:
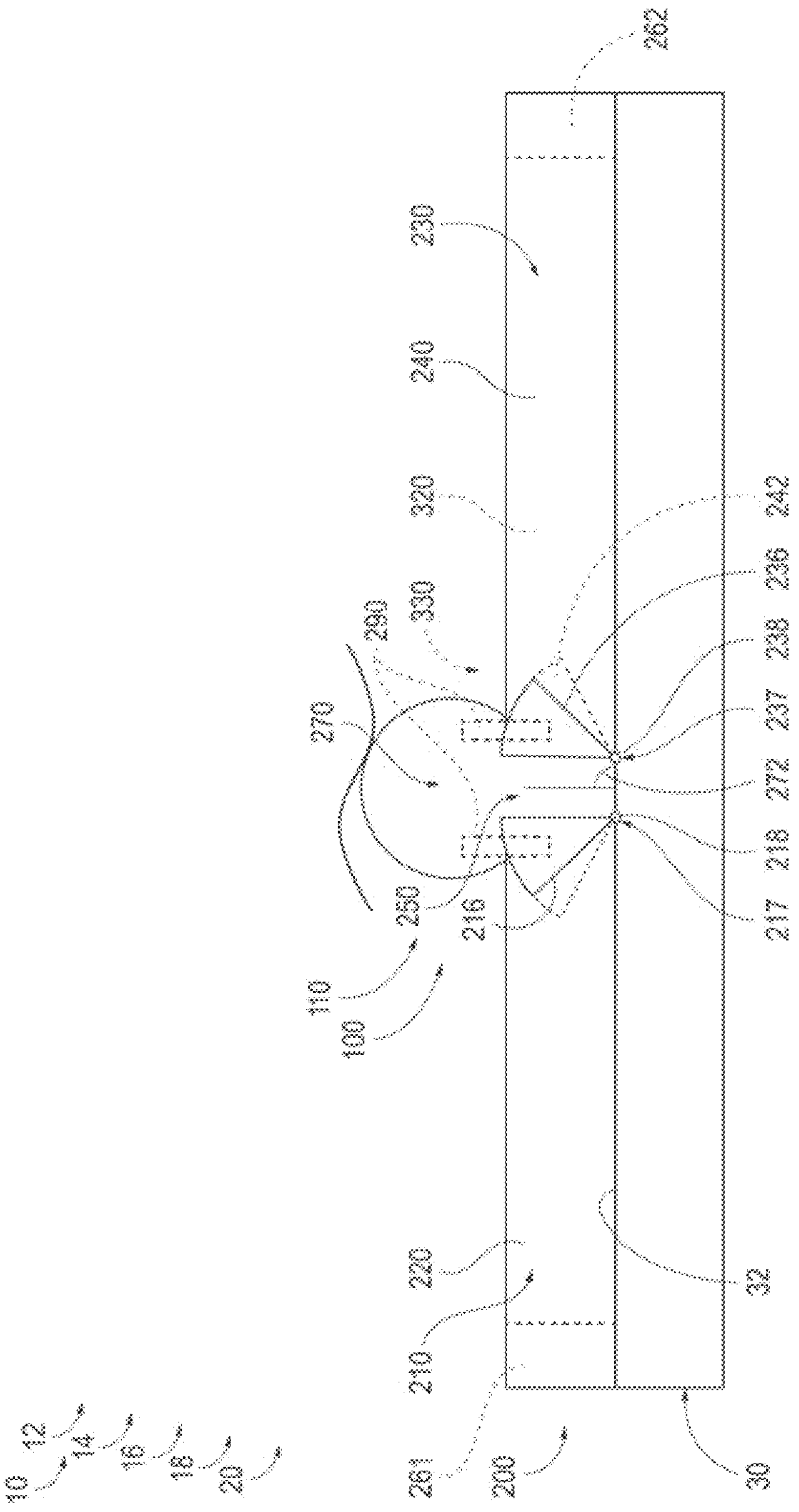
FIG. 14 is a schematic front view of examples of a fence of a bevel saw, according to the present disclosure, in the cross cut configuration and/or in the miter cut configuration.
Figure 15:
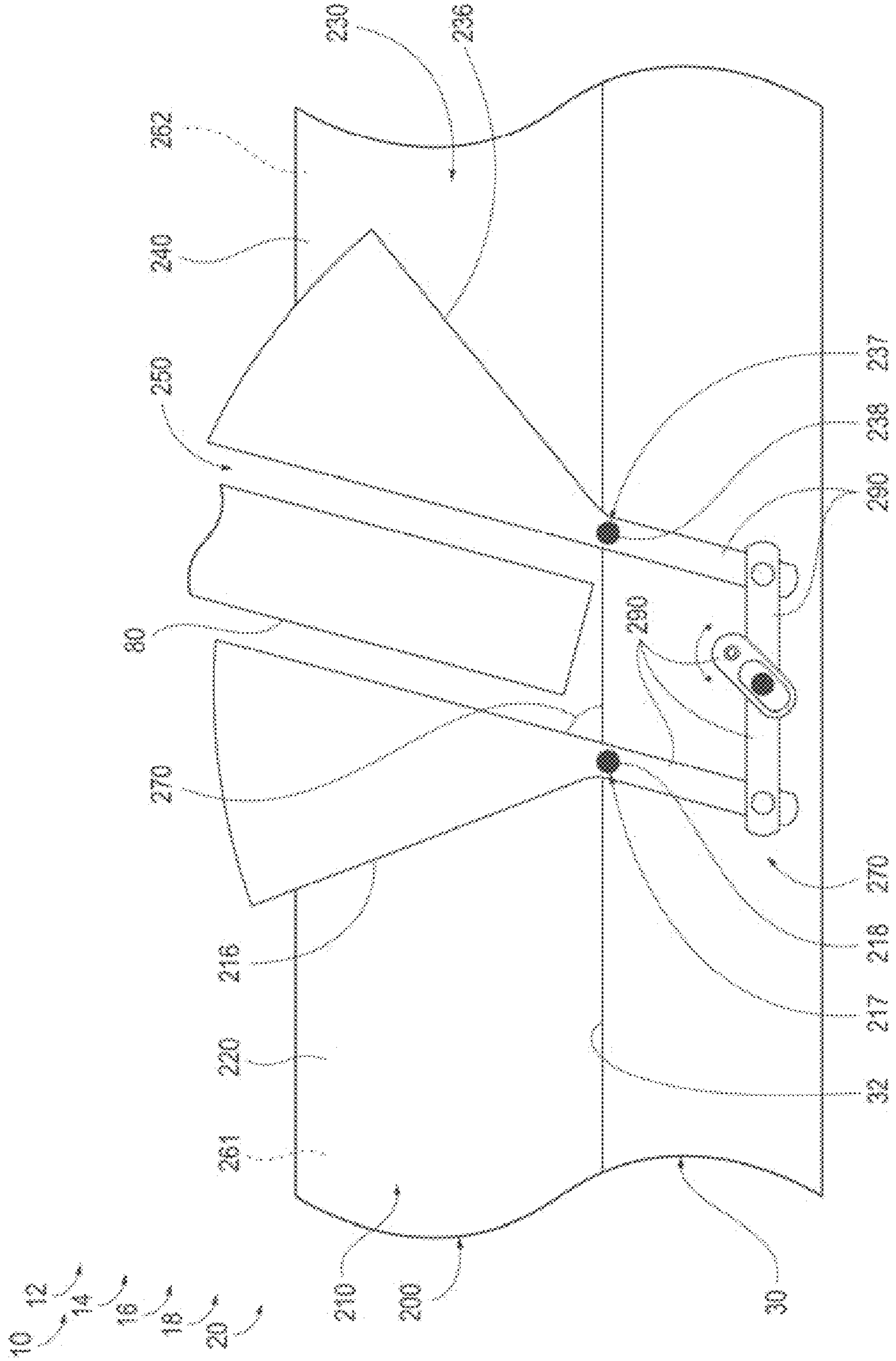
FIG. 15 is a less schematic rear view of examples of a fence of a bevel saw, according to the present disclosure, in the bevel cut configuration and/or in the compound cut configuration.
Figure 16:
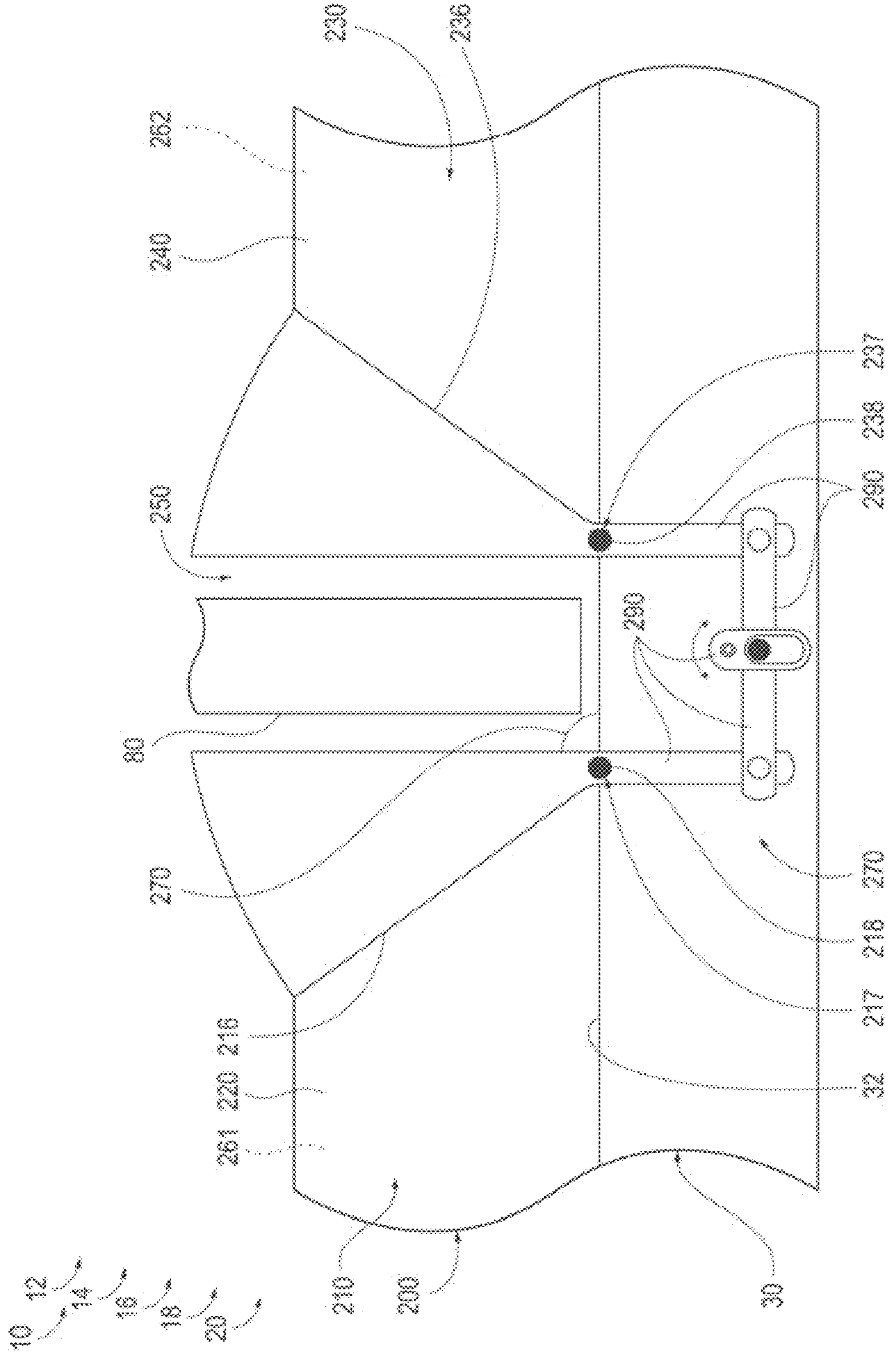
FIG. 16 is a less schematic rear view of examples of a fence of a bevel saw, according to the present disclosure, in the cross cut configuration and/or in the miter cut configuration.

As another example, gap adjustment mechanism 270 may be configured to change a shape of blade-receiving gap 250, such as is illustrated by the transition between the configurations illustrated in FIGS. 2-3, in FIGS. 6-7, in FIGS. 8-9, in FIGS. 13-14, and/or in FIGS. 15-16. As another example, gap adjustment mechanism 270 may be configured to change a gap bevel angle 272 of blade-receiving gap 250, as also illustrated by the transition between corresponding pairs of the above-referenced Figures. Gap bevel angle 272 may be defined as the angle between a longitudinal axis of blade-receiving gap 250 and workpiece support surface 32 and may be defined within a plane that extends within fence surface 260.

In some examples, gap adjustment mechanism 270 may include and/or be a linkage 290, as perhaps best illustrated in FIGS. 2-3 and 6-10. Linkage 290 may be operatively connected to blade bevel angle adjustment mechanism 110 and/or may be configured to actuate, to adjust, and/or to move, gap adjustment mechanism 270 responsive to and/or concurrently with actuation, adjustment, and/or motion of blade bevel angle adjustment mechanism 10. As an example, and responsive to adjustment of blade bevel angle adjustment mechanism 110, linkage 290 may be configured to apply a motive force that adjusts blade-receiving gap 250, such as to a corresponding gap shape and/or to a corresponding gap bevel angle 272. As another example, and as perhaps best illustrated in FIG. 10, linkage 290 may extend between blade bevel angle adjustment mechanism 110 and gap adjustment mechanism 270, thereby providing a mechanical connection that may apply the motive force. Linkage 290, when present, may include any suitable structure. Examples of linkage 290 include one or more of a rigid linkage, a linkage arm, a cam, a gear, a flexible linkage, a biased linkage, and/or a rotating shaft.

In some examples, gap adjustment mechanism 270 may include and/or be an electric gap adjustment actuator 330, as perhaps best illustrated in FIGS. 1-7 and 11-14. Electric gap adjustment actuator 330, when present, may be configured to automatically adjust blade-receiving gap 250 based, at least in part, on blade bevel angler 112 and/or based, at least in part, on adjustment of the blade bevel angle.

As an example, gap adjustment mechanism 270 may include a blade angle detector 300 in the form of a blade bevel angle detector 304. The blade angle detector may be configured to detect an angle of the bevel saw blade and to generate a blade angle output 302 that is indicative of the angle of the bevel saw blade. When blade angle detector 300 includes, or is, blade bevel angle detector 304, the blade bevel angle detector may generate blade angle output 302 in the form of a blade bevel angle output 306 that is indicative of blade bevel angle 112, as perhaps best illustrated in FIGS. 2-3. When gap adjustment mechanism 270 includes blade bevel angle detector 304, electric gap adjustment actuator 330 may be configured to adjust blade-receiving gap 250 based, at least in part, on blade bevel angle output 306 and/or responsive to a change in the blade bevel angle output.

Blade angle detector 300 additionally or alternatively may include, or be, a blade miter angle detector 308, which may be configured to detect blade miter angle 122 and/or to generate a blade miter angle output 310 that is indicative of the blade miter angle. This may be accomplished in any suitable manner. As an example, blade miter angle detector 308 may be configured to measure the blade miter angle. As another example, motion and/or relative adjustment of electric gap adjustment actuator 330 may be counted, stored, measured, and/or quantified to permit and/or facilitate determination of the blade miter angle.

Blade miter angle 122 may be adjusted via a blade miter angle adjustment mechanism 120 of assembly attachment structure 100. When gap adjustment mechanism 270 includes blade miter angle detector 308, electric gap adjustment actuator 330 may be configured to adjust blade-receiving gap 250 and/or to adjust a width of the blade-receiving gap based, at least in part, on blade miter angle output 310 and/or responsive to a change in the blade miter angle output.

As another example, gap adjustment mechanism 270 may include a blade distance sensor 320, as perhaps best illustrated in FIGS. 2-7 and 11-14. Blade distance sensor 320, when present, may be configured to detect a blade-fence distance 322 between bevel saw blade 80 and fence 200, as perhaps best illustrated in FIGS. 2-3. Blade distance sensor 320 also may be configured to generate a blade distance output 324 that is indicative of the distance between the bevel saw blade and the fence. In such a configuration, electric gap adjustment actuator 330 may be configured to adjust blade-receiving gap 250 based, at least in part, on the distance between the bevel saw blade and the fence based, at least in part, on blade distance output 324, and/or responsive to a change in the blade distance output. As discussed in more detail herein, blade distance sensor 320 may detect blade-fence distance 322 while bevel saw blade 80 is positioned within blade-receiving gap 250.

When gap adjustment mechanism 270 includes blade distance sensor 320, it is within the scope of the present disclosure that gap adjustment mechanism 270 may adjust blade-receiving gap 250 with any suitable timing relative to adjustment of blade bevel angle 112 and/or relative to adjustment of blade miter angle 122. As an example, adjustment of blade-receiving gap 250 may be responsive to adjustment of blade bevel angle 112 and/or to adjustment of blade miter angle 122. As another example, adjustment of blade-receiving gap 250 may be responsive to a user input, such as may be received responsive to actuation of a user input device 380 of the bevel saw, which is illustrated in FIGS. 1-3.

Turning more generally to FIGS. 1-16, fence surface 260 may include a first fence surface 261 and a second fence surface 262. First fence surface 261 may be defined by first fence region 210, and second fence surface 262 may be defined by second fence region 230. First fence surface 261 and second fence surface 262 may extend parallel to one another or may extend within a fence surface plane of fence surface 260. Fence 200 may be configured to change and/or to vary blade-receiving gap 250 and/or gap bevel angle 272 thereof by changing a shape of first fence surface 261 and/or by changing a shape of second fence surface 262.

Figure 10:
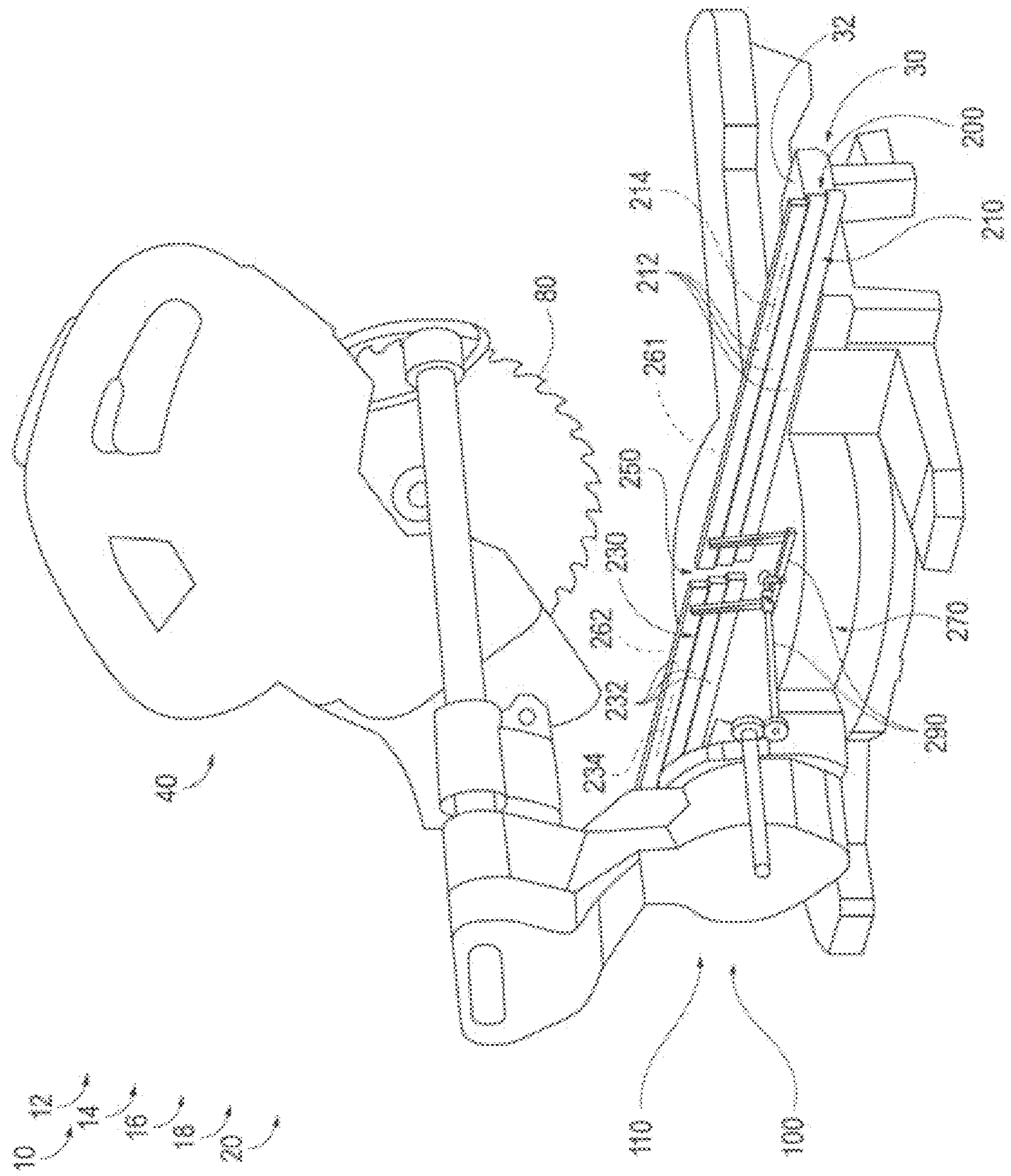
FIG. 10 is a schematic illustration of examples of a bevel saw, according to the present disclosure, in the bevel cut configuration and/or in the compound cut configuration.

As an example, and as illustrated schematically in FIGS. 1-7 and less schematically in FIGS. 8-10, first fence region 210 may include a plurality of first fence region translational elements 212 and/or second fence region 230 may include a plurality of second fence region translational elements 232. First fence region translational elements 212 may define first fence surface 261 and/or may be configured to operatively translate relative to one another, such as within the fence surface plane and/or along a first translation axis 214, to selectively adjust blade-receiving gap 250, or a first side of the blade-receiving gap. Similarly, second fence region translational elements 232 may define second fence surface 262 and/or may be configured to operatively translate relative to one another, such as within the fence surface plane and/or along a second translation axis 234, to selectively adjust blade-receiving gap 250, or a second side of the blade-receiving gap. First translation axis 214 and second translation axis 234 may be parallel to one another, may be coextensive with one another, and/or may extend within the same plane.

The operative translation may be relative to workpiece support surface 32, may be within the fence surface plane, and/or may be responsive to actuation of blade bevel angle adjustment mechanism 110. This is illustrated by the transition between the configuration that is illustrated in FIG. 6 and the configuration that is illustrated in FIG. 7 and/or by the transition between the configuration that is illustrated in FIG. 8 and the configuration that is illustrated in FIG. 9. As illustrated, operative translation of first fence region translational elements 212 and/or of second fence region translational elements 232 may be utilized to adjust the shape of blade-receiving gap 250, to adjust gap bevel angle 272 of blade-receiving gap 250, and/or to conform the shape of the blade-receiving gap to the blade bevel angle of the bevel saw blade. When fence 200 includes the plurality of first fence region translational elements 212 and/or the plurality of second fence region translational elements 232, gap bevel angle 272 may be defined as an angle between workpiece support surface 32 and a line that extends within a plane defined by fence surface 260 and along a longitudinal axis of blade-receiving gap 250.

The plurality of first fence region translational elements 212 may be stacked on top one another to incrementally space the plurality of first fence region translational elements above the workpiece support surface. Similarly, the plurality of second fence region translational elements 232 may be stacked on top of one another to incrementally space the plurality of second fence region translational elements above the workpiece support surface. Such a configuration may permit and/or facilitate adjustment of blade-receiving gap 250 within the fence surface plane.

The plurality of first fence region translational elements 212 may at least partially, at least substantially, or even completely define first fence surface 261. Similarly, the plurality of second fence region translational elements 232 may at least partially, at least substantially, or even completely define second fence surface 262. Such a configuration may permit and/or facilitate support of the workpiece by the first fence region translational elements and/or by the second fence region translational elements.

It is within the scope of the present disclosure that the plurality of first fence region translational elements and/or the plurality of second fence region translational elements may include any suitable number of translational elements. Examples of the number of translational elements include at least 2, at least 3, at least 4, at least 5, at least 6, at most 10, at most 8, at most 6, and/or or at most 4 first and/or second fence region translational elements. Additional examples of the number of translational elements include 2, 3, 4, 5, 6, 7, or 8 first and/or second fence region translational elements. A first number of first fence region translational elements may equal a second number of second fence region translational elements. The number of translational elements may be selected, for example, based upon a desired amount of adjustment to the shape of the blade-receiving gap.

The plurality of first fence region translational elements and/or the plurality of second fence region translational elements may have and/or define any suitable shape. As examples, the plurality of first fence region translational elements may include and/or be a plurality of elongate first fence region translational elements, a plurality of at least partially rectangular first fence region translational elements, and/or a plurality of at least partially rectangular solid first fence region translational elements. Similarly, the plurality of second fence region translational elements may include and/or be a plurality of elongate second fence region translational elements, a plurality of at least partially rectangular second fence region translational elements, and/or a plurality of at least partially rectangular solid second fence region translational elements.

It is within the scope of the present disclosure that first translation axis 214 and second translation axis 234 may extend parallel to one another, parallel to fence surface 260, and/or collinear with one another. Such a configuration may permit adjustment of blade-receiving gap 250 while maintaining a planar, or at least substantially planar, fence surface 260.

Gap adjustment mechanism 270 may be configured to translate, or to concurrently translate, both the plurality of first fence region translational elements and the plurality of second fence region translational elements. This may include concurrent translation in the same direction and/or the same distance, such as to maintain a distance between corresponding first and second fence region translational elements, and/or in opposite directions and/or by different distances, such as to vary the distance between corresponding first and second fence region translational elements. Such a configuration may permit and/or facilitate utilization of varying gap widths for different blade bevel angles and/or for different blade miter angles, as discussed in more detail herein.

As an example, and as illustrated in FIGS. 8-9, gap adjustment mechanism 270 may be operatively interconnected to both the plurality of first fence region translational elements and the plurality of second fence region translational elements. Additionally or alternatively, gap adjustment mechanism 270 may be configured to translate both the plurality of first fence region translational elements 212 and the plurality of second fence region translational elements 232 within the fence surface plane of fence surface 260.

As illustrated in FIGS. 6-9, the plurality of first fence region translational elements and the plurality of second fence region translational elements may be arranged in corresponding translational element pairs, with one translational element in a given translational element pair being from the plurality of first fence region translational elements and one translational element in the given translational element pair being from the plurality of second fence region translational elements. In such a configuration, gap adjustment mechanism 270 may be configured to translate each corresponding pair in the same, or at least substantially the same, direction. Additionally or alternatively, gap adjustment mechanism 270 may be configured to translate each corresponding pair by the same, or at least substantially the same, distance. Such a configuration may permit the width of blade-receiving gap 250 to be constant, or at least substantially constant, between corresponding translational element pairs.

As another example, as illustrated in FIGS. 1-7 and 11-14, gap adjustment mechanism 270 may include electric gap adjustment actuator 330. Electric gap adjustment actuator 330 may be configured to operatively translate at least one first fence region translational element 212 relative to workpiece support surface 32. Additionally or alternatively, electric gap adjustment actuator 330 may be configured to operatively translate at least one second fence region translational element 232 relative to workpiece support surface 32. Such a configuration may permit gap adjustment mechanism 270 to electrically vary the position, orientation, and/or shape of blade-receiving gap 250 via actuation of electric gap adjustment actuator 330.

Electric gap adjustment actuator 330 may include any suitable structure that may be adapted, configured, designed, and/or constructed to be electrically actuated and/or to electrically translate, or move, the at least one first fence region translational element 212 and/or the at least one second fence region translational element 232. Examples of electric gap adjustment actuator 330 include a rotary actuator, a linear actuator, an electric actuator, an electric motor, a servo motor, and/or a stepper motor.

Figure 11:
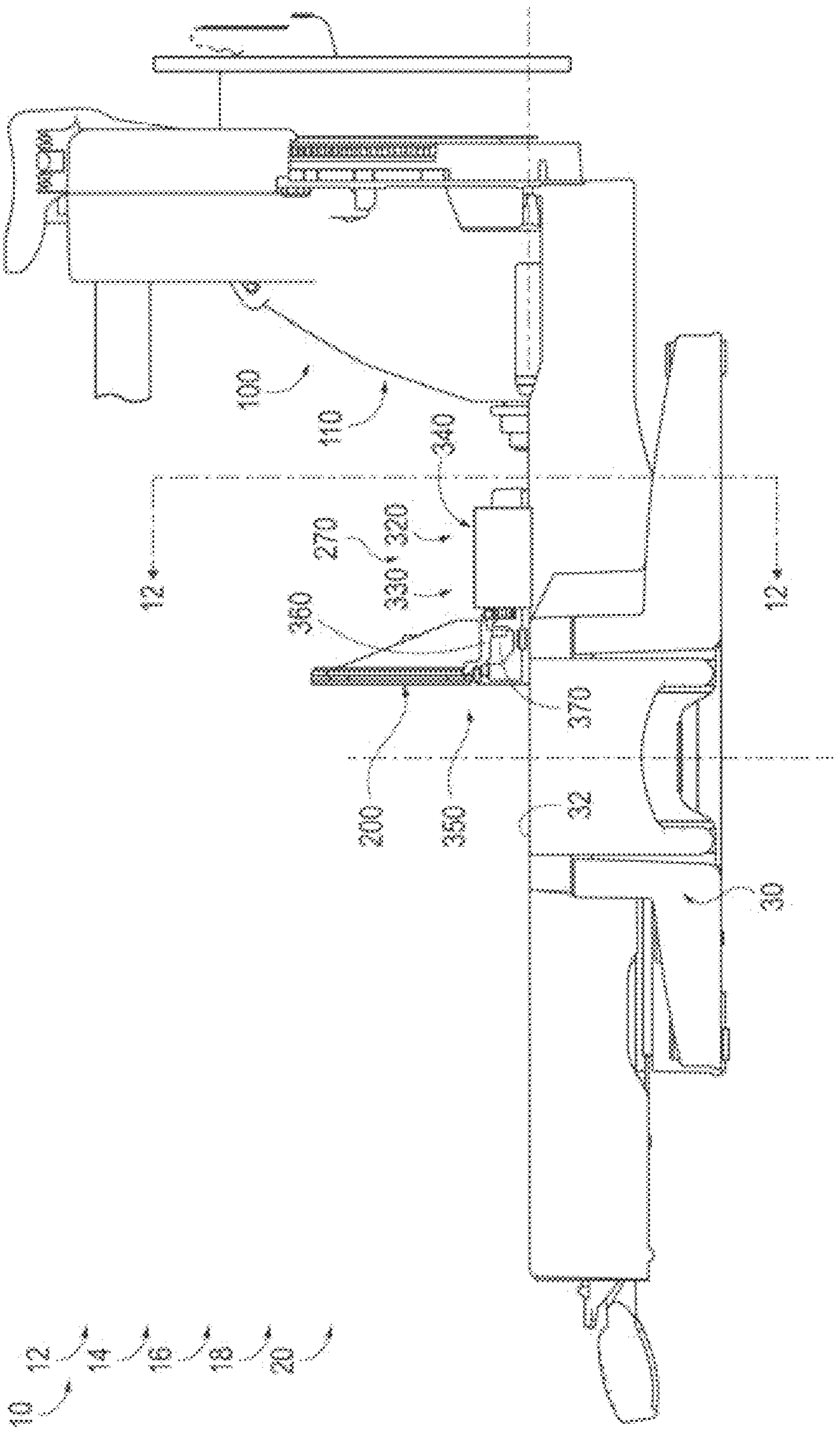
FIG. 11 is a side view of an example of a bevel saw according to the present disclosure.
Figure 12:
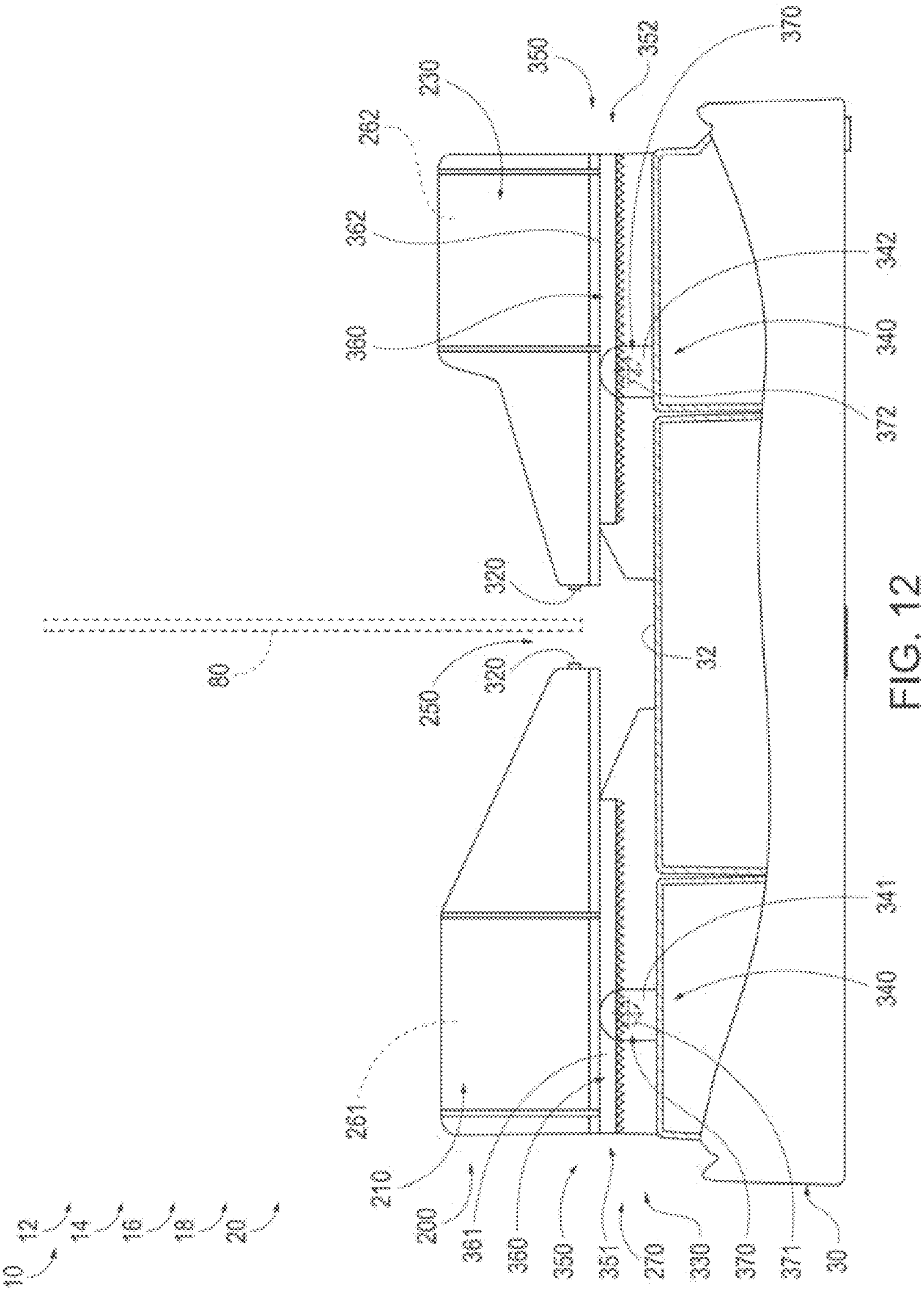
FIG. 12 is a cross-sectional view of the bevel saw of FIG. 11 taken along line 12-12 of FIG. 11.

In a specific example, and as perhaps best illustrated in FIGS. 11-12, electric gap adjustment actuator 330 may include a gap adjustment electric motor 340 and a rack and pinion assembly 350, which may include a toothed rack 360 and a pinion gear 370. Gap adjustment electric motor 340 may be configured to rotate pinion gear 370. Pinion gear 370 may mesh with toothed rack 360, thereby generating linear motion of toothed rack 360 responsive to actuation of gap adjustment electric motor 340. This linear motion may be utilized to adjust blade-receiving gap 250.

As a more specific example, and as perhaps best illustrated in FIG. 12, gap adjustment electric motor 340 may include a first gap adjustment electric motor 341 and/or a second gap adjustment electric motor 342. Similarly, rack and pinion assembly 350 may include a first rack and pinion assembly 351, which may include a first toothed rack 361 and a first pinion gear 371, and a second rack and pinion assembly 352, which may include a second toothed rack 362 and a second pinion gear 372. In such a configuration, the first toothed rack may be operatively attached to the at least one first fence region translational element 212, and the first gap adjustment electric motor may be operatively attached to the workpiece support. Additionally or alternatively, the second toothed rack may be operatively attached to the at least one second fence region translational element 232 and the second gap adjustment electric motor may be operatively attached to the workpiece support. Such a configuration may permit and/or facilitate independent and/or coordinated motion of the at least one first fence region and the at least one second fence region, thereby permitting adjustment of blade-receiving gap 250.

Additional examples of fences 200, according to the present disclosure, are illustrated in FIGS. 13-16. In these examples, first fence region 210 may include a first fence region rotary element 216, which may be configured to rotate relative to workpiece support surface 32 and/or responsive to actuation of blade bevel angle adjustment mechanism 110, such as to selectively adjust blade-receiving gap 250. First fence region 210 also may include a first fence region stationary element 220, which may be distal blade-receiving gap 250 relative to first fence region rotary element 216 and/or may be configured to maintain a fixed position and/or orientation relative to workpiece support surface 32.

First fence region rotary element 216 and/or first fence region stationary element 220 may at least partially define first fence surface 261, and first fence region rotary element 216 may be configured to rotate within the fence surface plane of fence surface 260. This may include rotation about a first fence region rotary axis 218, which may extend parallel to workpiece support surface 32, may extend parallel to bevel saw blade 80, and/or may extend perpendicular to fence surface 260. First fence region rotary axis 218 may be defined by a first pivot 217, which may be configured to facilitate operative rotation of the first fence region rotary element relative to the workpiece support. First fence region rotary element 216 may be arranged in a first recessed portion 222 of first fence region stationary element 220 for forming or maintaining a planar, or at least substantially planar, fence surface 260. First fence region rotary element 216 may have and/or define any suitable shape. As examples, first fence region rotary element 216 may include and/or be an at least partially triangular first fence rotary region, an at least partially circular first fence rotary region, and/or an at least partially circular sector first fence rotary region. As another example, first fence region rotary element 216 may taper away from first pivot 217 and/or may taper within the fence surface plane.

Additionally or alternatively, second fence region 230 may include a second fence region rotary element 236, which may be configured to rotate relative to workpiece support surface 32 and/or responsive to actuation of blade bevel angle adjustment mechanism 110, such as to selectively adjust blade-receiving gap 250. Second fence region 230 also may include a second fence region stationary element 240, which may be distal blade-receiving gap 250 relative to second fence region rotary element 236 and/or may be configured to maintain a fixed position and/or orientation relative to workpiece support surface 32. Second fence region rotary element 236 and/or second fence region stationary element 240 may at least partially define second fence surface 262, and second fence region rotary element 236 may be configured to rotate within the fence surface plane of the fence surface. This may include rotation about a second fence region rotary axis 238, which may extend parallel to workpiece support surface 32, may extend parallel to bevel saw blade 80, may extend perpendicular to fence surface 260, and/or may extend parallel to first fence region rotary axis 218. Second fence region rotary axis 238 may be defined by a second pivot 237, which may be configured to facilitate operative rotation of the second fence region rotary element relative to the workpiece support.

Second fence region rotary element 236 may be arranged in a second recessed portion 242 of second fence region stationary element 240 for forming or maintaining a planar, or at least substantially planar, fence surface 260. Second fence region rotary element 236 may have and/or define any suitable shape. As examples, second fence region rotary element 236 may include and/or be an at least partially triangular second fence rotary region, an at least partially circular second fence rotary region, and/or an at least partially circular sector second fence rotary region. As another example, second fence region rotary element 236 may taper away from second pivot 237 and/or may taper within the fence surface plane.

It is within the scope of the present disclosure that gap adjustment mechanism 270 may be configured to concurrently or independently rotate first fence region rotary element 216 and second fence region rotary element 236. As an example, and as perhaps best illustrated in FIGS. 15-16, linkage 290 may operatively interconnect with both first fence region rotary element 216 and second fence region rotary element 236, thereby permitting and/or facilitating concurrent rotation of the first fence region rotary element and the second fence region rotary element. As another example, and as perhaps best illustrated in FIGS. 13-14, electric gap adjustment actuator 330 may be utilized to rotate first fence region rotary element 216 and/or second fence region rotary element 236.

Additionally or alternatively, electric gap adjustment actuator 330 may be utilized to operatively translate first fence region rotary element 216 and/or second fence region rotary element 236 relative to one another, such as toward and/or away from one another, and/or to operatively translate first fence region stationary element 220 and/or second fence region stationary element 240 relative to one another, such as toward and/or away from one another. Such a configuration may permit and/or facilitate adjustment of the gap width of blade-receiving gap 250.

It is within the scope of the present disclosure that bevel saws 10 may include and/or be any suitable saw that includes blade bevel angle adjustment mechanism 110 and fence 200 including gap adjustment mechanism 270 thereof. Examples of bevel saws 10 include a stationary bevel saw 12, such as may be configured to be installed at, and to remain at, a given location, and/or a semi-stationary bevel saw 14, such as may be configured to be moved from one location to another and to be supported by the ground and/or by a table during operative use thereof. Additional examples of bevel saws 10 include a miter saw 16, a sliding miter saw 19, and/or a compound miter saw 20. Bevel saw blade 80 also may be referred to herein as and/or may be a circular saw blade 80.

With the above in mind, assembly attachment structure 100 may include any suitable structure that may be adapted, configured, designed, and/or constructed to operatively attach user-actuated assembly 40 to workpiece support 30, that may permit constrained motion of the user-actuated assembly relative to the workpiece, that may include blade bevel angle adjustment mechanism 110, and/or that may include blade miter angle adjustment mechanism 120. A specific configuration of assembly attachment structure 100 may vary with the configuration of bevel saws 10.

In some examples, and as illustrated in FIGS. 1-5, assembly attachment structure 100 and/or blade bevel angle adjustment mechanism 110 thereof may include a bevel adjustment lock 280. Bevel adjustment lock 280 may be configured to be selectively transitioned between an unlocked state, in which the bevel adjustment lock permits adjustment of blade bevel angle adjustment mechanism 110 and/or of gap adjustment mechanism 270, and a locked state, in which the bevel adjustment lock resists adjustment of the blade bevel angle adjustment mechanism and/or of the gap adjustment mechanism. Such a configuration may permit adjustment of the blade bevel angle adjustment mechanism to a desired blade bevel angle and subsequent retention of the blade bevel angle adjustment mechanism at the desired blade bevel angle during operative use of the bevel saw to cut the workpiece.

In some examples, blade bevel angle adjustment mechanism 110 may be configured to permit and/or to facilitate manual adjustment of the blade bevel angle by a user of bevel saw 10. In such a configuration, gap adjustment mechanism 270 may be configured to automatically adjust blade-receiving gap 250 responsive to adjustment of the blade bevel angle, such as via and/or utilizing linkage 290. As an example, manual adjustment of the blade bevel angle adjustment mechanism may produce a motive force that urges linkage 290 to cause a corresponding adjustment of blade-receiving gap 250.

In other examples, blade bevel angle adjustment mechanism may include an electric bevel actuator 390, which may be configured to automatically adjust the blade bevel angle, such as responsive to a user input via user input device 380. In such a configuration, gap adjustment mechanism 270 may include an electric gap actuator 274 that also may be configured to automatically adjust blade-receiving gap 250 based, at least in part, on the user input. Additionally or alternatively, electric bevel actuator 390 may produce the motive force that urges linkage 290 to cause a corresponding adjustment of blade-receiving gap 250.

As discussed, assembly attachment structure 100 may include blade miter angle adjustment mechanism 120, which may be configured to adjust blade miter angle 122. This adjustment of blade miter angle 122 may be within a miter angle plane, which may extend parallel to and/or within workpiece support surface 32. In some examples, blade miter angle adjustment mechanism 120 may be configured to permit and/or to facilitate manual adjustment of the blade miter angle by the user of bevel saw 10. In other examples, blade miter angle adjustment mechanism 120 may include an electric miter actuator 395, which may be configured to automatically adjust the blade bevel angle, such as responsive to a user input via user input device 380, in such a configuration, gap adjustment mechanism 270 also may be configured to automatically adjust blade-receiving gap 250 based, at least in pat, on the user input.

In some examples of bevel saws 10, assembly attachment structure 100 also may include a user-actuated assembly pivot 130. User-actuated assembly pivot 130 may be configured to permit user-actuated assembly 40 to pivot and/or to rotate, relative to workpiece support 30, about a pivot axis 132, as perhaps best illustrated in FIGS. 2-5. Pivot axis 132 may extend parallel to a rotational axis of arbor 56 and/or perpendicular to a plane within which bevel saw blade 80 rotates. Such a configuration may permit user-actuated assembly 40 to pivot toward and/or away from workpiece support 30, such as to permit and/or facilitate cutting of the workpiece by the bevel saw blade.

In some examples of bevel saws 10, assembly attachment structure 100 may include a user-actuated assembly linear translation structure 140. User-actuated assembly linear translation structure 140 may be configured to permit user-actuated assembly 40 to translate relative to workpiece support 30 and/or along a linear translation axis 142. Linear translation axis 142 may extend parallel to workpiece support surface 32. Such a configuration may permit bevel saws 10 to cut relatively wider workpieces 90 via translation of the user actuated assembly, and the bevel saw blade, along linear translation axis 142 and relative to the workpiece.

It is within the scope of the present disclosure that bevel saws 10 may include one or more additional components that may be common in conventional bevel saws. As an example, bevel saws 10 may include a gripping region 60, which may be configured to be gripped by the user of the bevel saw during operation of the bevel saw to form the bevel cut in the workpiece. As another example, bevel saws 10 may include a switch 70, which may be configured to be selectively actuated by the user to selectively apply an electric current to at least one other component of the bevel saw. As yet another example, bevel saws 10 may include bevel saw blade 80, which may be operatively attached to the bevel saw via arbor 56.

As another example, bevel saws 10 may include a controller 400, as illustrated in FIGS. 2-3. Controller 400 may be programmed to control the operation of at least one other component of bevel saws 10, to receive inputs to at least one other component of bevel saws 10, and/or to provide outputs to at least one other component of bevel saws 10. As an example, controller 400 may be programmed to control the operation of electric gap adjustment actuator 330, when present. This control may be based, at least in part, on blade bevel angle output 306, blade miter angle output 310, and/or blade distance output 324, when present. As another example, controller 400 may be programmed to perform any suitable step and/or steps of methods 500, which are discussed in more detail herein.

Figure 17:
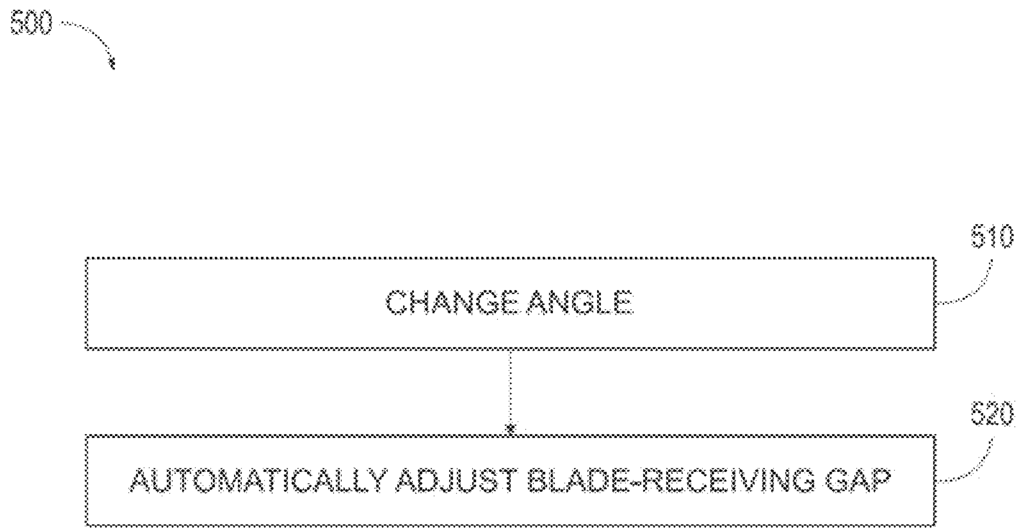
FIG. 17 is a flowchart depicting examples of methods of adjusting a fence of a bevel saw, according to the present disclosure.

FIG. 17 is a flowchart depicting examples of methods 500 of adjusting a fence of a bevel saw, according to the present disclosure. Methods 500 include changing an angle at 510 and automatically adjusting a blade-receiving gap at 520. Examples of the bevel saw are disclosed herein with reference to bevel saws 10 of FIGS. 1-16. Examples of the fence are disclosed herein with reference to fence 200 of FIGS. 1-2. Examples of the angle are disclosed herein with reference to blade bevel angle 112 and blade miter angle 122. Examples of the blade-receiving gap are disclosed herein with reference to blade-receiving gap 250.

Changing the angle at 510 may include changing a blade bevel angle of the bevel saw and/or changing a blade miter angle of the bevel saw. In some examples the changing at 510 may include manually adjusting the blade bevel angle and/or the blade miter angle. As a more specific example, the bevel saw may include a blade bevel angle adjustment mechanism, examples of which are disclosed herein with reference to blade bevel angle adjustment mechanism 110, and the changing at 510 may include manually actuating the blade bevel angle adjustment mechanism. As another more specific example, the bevel saw may include a blade miter angle adjustment mechanism, examples of which are disclosed herein with reference to blade miter angle adjustment mechanism 120, and the changing at 510 may include manually actuating the blade miter angle adjustment mechanism.

In some examples, the bevel saw may include an electric bevel actuator, which may be configured to automatically adjust the blade bevel angle responsive to a user input, and/or an electric miter actuator, which may be configured to automatically adjust the blade miter angle responsive to the user input. In such examples, the changing at 510 may include changing the blade bevel angle and/or the blade miter angle responsive to receipt of the user input. Examples of the electric bevel actuator are disclosed herein with reference to electric bevel actuator 390. Examples of the electric miter actuator are disclosed herein with reference to electric miter actuator 395. The user input may be received via a user input device, examples of which are disclosed herein with reference to user input device 380.

Automatically adjusting the blade-receiving gap at 520 may include automatically adjusting the blade-receiving gap, which may be defined by the fence, based, at least in part, on the changing at 510. The automatically adjusting at 520 may be accomplished in any suitable manner and with any suitable structure. As an example, the changing at 510 may include actuating a linkage, and the automatically adjusting at 520 may be responsive to and/or a result of actuation of the linkage. Examples of the linkage are disclosed herein with reference to linkage 290.

As another example, the bevel saw may include an electric gap adjustment actuator, and the changing at 520 may include changing with, via, and/or utilizing the electric gap adjustment actuator. Examples of the electric gap adjustment actuator are disclosed herein with reference to electric gap adjustment actuator 330.

When the bevel saw includes the electric gap adjustment actuator, the automatically adjusting at 520 may be responsive, or immediately responsive, to the changing at 510. As an example, methods 500 may include detecting the blade bevel angle and/or the blade miter angle, such as via a blade angle detector of the bevel saw, and the automatically adjusting at 520 may be based upon and/or responsive to the detecting. Examples of the blade angle detector are disclosed herein with reference to blade angle detector 300, blade bevel angle detector 304, and/or blade miter angle detector 308.

Additionally or alternatively, the adjusting at 520 may be subsequent to the changing at 510 and/or may be responsive to receipt of the user input by the electric gap adjustment actuator. As an example, receipt of the user input may indicate, to the bevel saw, that the user desires the blade-receiving gap to be adjusted, and the bevel saw may be configured to adjust the blade-receiving gap subsequent to receipt of the user input. As another example, methods 500 further may include detecting a blade-fence distance between the bevel saw blade and the fence, and the automatically adjusting at 520 may be based, at least in part, on the blade-fence distance. The blade-fence distance only may be detected when the bevel saw blade is positioned and/or extends within the blade-receiving gap, and the user input may be utilized to indicate, to the bevel saw, that the bevel saw blade is positioned within the blade-receiving gap and/or to initiate detection of the blade-fence distance.

The detecting the blade-fence distance may be accomplished in any suitable manner and with any suitable structure. As an example, the detecting the blade-fence distance may be performed via and/or utilizing a blade distance sensor of the bevel saw. Examples of the blade distance sensor are disclosed herein with reference to blade distance sensor 320. In some examples, the detecting the blade-fence distance may include contacting the blade with the blade distance sensor, such as via motion of the fence relative to the bevel saw blade and/or via changing and/or adjusting the blade-receiving gap. In such examples, the automatically adjusting at 520 may include subsequently retracting the fence from the bevel saw to define a desired blade-fence distance. The blade-receiving gap may be adjusted in any suitable manner and with any suitable structure. As an example, the adjusting at 520 may include adjusting the blade-fence distance to the desired blade-fence distance. As another example, the adjusting at 520 may include adjusting, or changing, a position of the blade-receiving gap relative to the bevel saw blade, adjusting a distance between the first fence region and the second fence region, and/or adjusting the first fence region and the second fence region relative to each other and/or based upon the blade bevel angle and/or the blade miter angle. As yet another example, the adjusting at 520 may include adjusting, or changing, a shape of the blade-receiving gap, such as via adjustment of an orientation of the blade-receiving gap, adjustment of a gap bevel angle of the blade-receiving gap, and/or adjustment of a gap width of the blade-receiving gap. In some such examples, the gap width may be adjusted and/or varied based, at least in part, on the blade bevel angle and/or the blade miter angle. Such a configuration may permit and/or facilitate utilization of improved and/or optimized blade-fence distances, especially when the blade bevel angle and/or the blade miter angle differs substantially from 90 degrees. Examples of the gap bevel angle are disclosed herein with reference to gap bevel angle 272.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B" or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A);

in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive % exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

Illustrative, non-exclusive examples of bevel saws, components of bevel saws, and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A bevel saw configured to form a bevel cut in a workpiece, the bevel saw comprising:

a workpiece support that defines a workpiece support surface configured to support a first side of the workpiece;

a user-actuated assembly that includes a motor including a motor shaft configured to rotate about a shaft rotational axis and an arbor operatively attached to the motor shaft and configured to receive a bevel saw blade;

an assembly attachment structure that operatively attaches the user-actuated assembly to the workpiece support and is configured to permit constrained motion of the user-actuated assembly relative to the workpiece support surface, wherein the assembly attachment structure includes a blade bevel angle adjustment mechanism configured to adjust a blade bevel angle of the bevel saw blade relative to the workpiece support surface; and a fence that defines a fence surface that extends away from the workpiece support surface and is configured to support a second side of the workpiece, wherein the fence includes a first fence region and a second fence region, wherein the first fence region and the second fence region define a blade-receiving gap therebetween, wherein the blade-receiving gap is configured to receive the bevel saw blade during operative use of the bevel saw to form the bevel cut in the workpiece, and further wherein the fence includes a gap adjustment mechanism configured to automatically adjust the blade-receiving gap based, at least in part, on the blade bevel angle.

A1.1 The bevel saw of paragraph A1, wherein a bevel saw blade is attached to the arbor and/or driven by the arbor.

A2. The bevel saw of paragraph A1 or paragraph A1.1, wherein the gap adjustment mechanism is configured to adjust the blade-receiving gap within a bevel angle plane that extends at least one of parallel to the fence surface and perpendicular to the workpiece support surface.

A3. The bevel saw of any of paragraphs A1-A2, wherein the gap adjustment mechanism is configured to at least one of (i) change a shape of the blade-receiving gap; and (ii) change a gap bevel angle of the blade-receiving gap.

A4. The bevel saw ofany of paragraphs A1-A3, wherein the gap adjustment mechanism includes a linkage that is operatively interconnected to the blade bevel angle adjustment mechanism.

A5. The bevel saw of paragraph A4, wherein, responsive to adjustment of the blade bevel angle via the blade bevel angle adjustment mechanism, the linkage is configured to apply a motive force that adjusts the blade-receiving gap to a corresponding gap bevel angle.

A6. The bevel saw of any of paragraphs A4-A5, wherein the linkage is configured such that the gap adjustment mechanism automatically adjusts the blade-receiving gap responsive to adjustment of the blade bevel angle by the blade bevel angle adjustment mechanism.

A7. The bevel saw of any of paragraphs A4-A6, wherein the linkage is configured such that the gap adjustment mechanism adjusts the blade-receiving gap concurrently with adjustment of the blade bevel angle by the blade bevel angle adjustment mechanism.

A8. The bevel saw of any of paragraphs A1-A7, wherein the gap adjustment mechanism includes an electric gap adjustment actuator configured to automatically adjust the blade-receiving gap based, at least in part, on the blade bevel angle.

A9. The bevel saw of paragraph A8, wherein the gap adjustment mechanism further includes a blade bevel angle detector configured to detect the blade bevel angle and to generate a blade bevel angle output that is indicative of the blade bevel angle, and further wherein the electric gap adjustment actuator is configured to adjust the blade-receiving gap based, at least in part, on the blade bevel angle output.

A10. The bevel saw of any of paragraphs A8-A9, wherein the gap adjustment mechanism further includes a blade miter angle detector configured to detect a blade miter angle and to generate a blade miter angle output that is indicative of the blade miter angle, and further wherein the electric gap adjustment actuator is configured to at least one of (i) adjust the blade-receiving gap based, at least in part, on the blade miter angle output; and (ii) adjust a width of the blade-receiving gap based, at least in part, on the blade miter angle output.

A11. The bevel saw of any of paragraphs A8-A10, wherein the gap adjustment mechanism further includes a blade distance sensor configured to detect a blade-fence distance between the bevel saw blade and the fence and to generate a blade distance output that is indicative of the distance between the bevel saw blade and the fence, and further wherein the electric gap adjustment actuator is configured to adjust the blade-receiving gap based, at least in part, on the distance between the bevel saw blade and the fence.

A12. The bevel saw of any of paragraphs A1-A11, wherein the fence surface includes a first fence surface, which is defined by the first fence region, and a second fence surface, which is defined by the second fence region.

A13. The bevel saw of paragraph A12, wherein the first fence surface and the second fence surface extend within a fence surface plane of the fence surface.

A14. The bevel saw of any of paragraphs A12-A13, wherein the first fence region includes a plurality of first fence region translational elements configured to operatively translate, relative to the workpiece support surface and responsive to actuation of the blade bevel angle adjustment mechanism, to selectively adjust the blade-receiving gap.

A15. The bevel saw of paragraph A14, wherein the plurality of first fence region translational elements is stacked on top of one another to incrementally space the plurality of first fence region translational elements above the workpiece support surface.

A16. The bevel saw of any of paragraphs A14-A15, wherein the plurality of first fence region translational elements is configured to operatively translate within a/the fence surface plane.

A17. The bevel saw of any of paragraphs A14-A16, wherein the plurality of first fence region translational elements at least partially, optionally at least substantially, and further optionally completely defines the first fence surface.

A18. The bevel saw of any of paragraphs A14-A17, wherein each first fence element of the plurality of first fence region translational elements is configured to translate along a, or a single, first translation axis that is parallel to the first fence surface.

A19. The bevel saw of any of paragraphs A14-A18, wherein the plurality of first fence region translational elements includes at least one of (i) at least 2, at least 3, at least 4, at least 5, or at least 6 first fence region translational elements;

(ii) at most 10, at most 8, at most 6, or at most 4 first fence region translational elements; and (iii) 2, 3, 4, 5, 6, 7, or 8 first fence region translational elements.

A20. The bevel saw of any of paragraphs A14-A19, wherein the plurality of first fence region translational elements at least one of:

(i) defines a plurality of elongate first fence region surfaces that at least partially defines the first fence surface; and (ii) includes a plurality of at least partially rectangular first fence region translational elements.

A21. The bevel saw of any of paragraphs A1-A20, wherein the blade bevel angle adjustment mechanism includes a/the electric gap adjustment actuator and at least one first fence region translational element, wherein the electric gap adjustment actuator is configured to operatively translate the at least one first fence region translational element relative to the workpiece support surface.

A22. The bevel saw of paragraph A21, wherein the electric gap adjustment actuator includes a first gap adjustment electric motor, and further wherein the blade bevel angle adjustment mechanism includes a first rack-and-pinion assembly.

A23. The bevel saw of paragraph A22, wherein the first rack-and-pinion assembly includes a first toothed rack and a first pinion gear, wherein the first gap adjustment electric motor is configured to rotate the first pinion gear, wherein the first toothed rack is operatively attached to the at least one first fence region translational element and further wherein the first gap adjustment electric motor is operatively attached to the workpiece support.

A24. The bevel saw of any of paragraphs A12-A23, wherein the second fence region includes a plurality of second fence region translational elements configured to operatively translate, relative to the workpiece support surface and responsive to actuation of the blade bevel angle adjustment mechanism, to selectively adjust the blade-receiving gap.

A25. The bevel saw of paragraph A24, wherein the plurality of second fence region translational elements is stacked on top of one another to incrementally space the plurality of second fence region translational elements above the workpiece support surface.

A26. The bevel saw of any of paragraphs A24-A25, wherein the plurality of second fence region translational elements is configured to operatively translate within a/the fence surface plane.

A27. The bevel saw of any of paragraphs A24-A26, wherein the plurality of second fence region translational elements at least partially, optionally at least substantially, and further optionally completely defines the second fence surface.

A28. The bevel saw of any of paragraphs A24-A27, wherein each second fence region translational element of the plurality of second fence region translational elements is configured to translate along a, or a single, second translation axis that is parallel to the second fence surface.

A29. The bevel saw of any of paragraphs A24-A28, wherein the plurality of second fence region translational elements includes at least one of:

(i) at least 2, at least 3, at least 4, at least 5, or at least 6 second fence region translational elements;

(ii) at most 10, at most 8, at most 6, or at most 4 second fence region translational elements, and (iii) 2, 3, 4, 5, 6, 7, or 8 second fence region translational elements.

A29.1. The bevel saw of any of paragraphs A24-A29, wherein a first number of a/the plurality of first fence region translational elements is equal to a second number of the plurality of second fence region translational elements.

A30. The bevel saw of any of paragraphs A24-A29.1, wherein the plurality of second fence region translational elements at least one of:

(i) defines a plurality of elongate second fence region surfaces that at least partially defines the second fence surface; and (ii) includes a plurality of at least partially rectangular second fence region translational elements.

A3. The bevel saw of any of paragraphs A23-A30, wherein the blade bevel angle adjustment mechanism includes the electric gap adjustment actuator and at least one second fence region translational element, wherein the electric gap adjustment actuator is configured to operatively translate the at least one second fence region translational element of a/the plurality of second fence region translational elements relative to the workpiece support surface.

A32. The bevel saw of paragraph A31, wherein the electric gap adjustment actuator includes a second gap adjustment electric motor, and further wherein the blade bevel angle adjustment mechanism includes a second rack-and-pinion assembly.

A33. The bevel saw of paragraph A32, wherein the second rack-and-pinion assembly includes a second toothed rack and a second pinion gear, wherein the second gap adjustment electric motor is configured to rotate the second pinion gear, wherein the second toothed rack is operatively attached to the at least one second fence region translational element and further wherein the second gap adjustment electric motor is operatively attached to the workpiece support.

A34 The bevel saw of any of paragraphs A24-A33, wherein a/the second translation axis of the plurality of second fence region translational elements of the second fence region is parallel to a/the first translation axis of a/the plurality of first fence region translational elements of the first fence region.

A35. The bevel saw of any of paragraphs A24-A34, wherein the gap adjustment mechanism is configured to concurrently translate both the plurality of second fence region translational elements and a/the plurality of first fence region translational elements, optionally at least one of:

(i) in the same direction;

(ii) in opposite directions;

(iii) by the same distance; and (iv) by different distances.

A36. The bevel saw of any of paragraphs A34-A35, wherein the gap adjustment mechanism is configured to translate both the plurality of second fence region translational elements and a/the plurality of first fence region translational elements within a/the fence surface plane.

A37 The bevel saw of any of paragraphs A24-A36, wherein the plurality of second fence region translational elements and a/the plurality of first fence region translational elements are arranged in corresponding translational element pairs, and further wherein the gap adjustment mechanism is configured to at least one of (i) translate each corresponding pair in the same, or at least substantially the same, direction; and (ii) translate each corresponding pair by the same, or at least substantially the same, distance.

A38. The bevel saw of any of paragraphs A12-A37, wherein the first fence region includes a first fence region rotary element configured to operatively rotate, relative to the workpiece support surface and responsive to actuation of the blade bevel angle adjustment mechanism, to selectively adjust the blade-receiving gap.

A39. The bevel saw of paragraph A38, wherein the first fence region further includes a first fence region stationary element that is distal the blade-receiving gap relative to the first fence region rotary element.

A40. The bevel saw of paragraph A39, wherein the first fence region rotary element at least partially defines the first fence surface.

A41. The bevel saw of any of paragraphs A38-A40, wherein the first fence region rotary element is configured to rotate within a/the fence surface plane of the fence surface.

A42. The bevel saw of any of paragraphs A38-A41, wherein the first fence region rotary element is configured to rotate about a first fence region rotary axis that extends parallel to the workpiece support surface.

A43. The bevel saw of any of paragraphs A38-A42, wherein the first fence region rotary element includes at least one of:

(i) an at least partially triangular first fence rotary region;

(ii) an at least partially circular first fence rotary region; and (iii) an at least partially circular sector first fence rotary region.

A44. The bevel saw of any of paragraphs A38-A43, wherein the first fence region further includes a first pivot configured to facilitate operative rotation of the first fence region rotary element relative to the workpiece support.

A45. The bevel saw of paragraph A44, wherein the first fence region rotary element tapers away from the first pivot within a/the fence surface plane.

A46. The bevel saw of any of paragraphs A12-A45, wherein the second fence region includes a second fence region rotary element configured to operatively rotate, relative to the workpiece support surface and responsive to actuation of the blade bevel angle adjustment mechanism, to selectively vary the blade-receiving gap.

A47. The bevel saw of paragraph A46, wherein the second fence region further includes a second fence region stationary element that is distal the blade-receiving gap relative to the second fence region rotary element.

A48. The bevel saw of paragraph A47, wherein the second fence region rotary element at least partially defines the second fence surface.

A49. The bevel saw of any of paragraphs A46-A48, wherein the second fence region rotary element is configured to rotate within a/the fence surface plane of the fence surface.

A50. The bevel saw of any of paragraphs A46-A49, wherein the second fence region rotary element is configured to rotate about a second fence region rotary axis that extends parallel to the workpiece support surface.

A51. The bevel saw of paragraph A50, wherein the second fence region rotary axis extends parallel to a/the first fence region rotary axis of the first fence region.

A52 The bevel saw of any of paragraphs A46-A51, wherein the second fence region rotary element includes at least one of:

(i) an at least partially triangular second fence rotary region;

(ii) an at least partially circular second fence rotary region; and (iii) an at least partial circular sector second fence rotary region.

A53. The bevel saw of any of paragraphs A46-A52, wherein the second fence region further includes a second pivot configured to facilitate operative rotation of the second fence region rotary element relative to the workpiece support.

A54. The bevel saw of paragraph A53, wherein the second fence region rotary element tapers away from the second pivot within a/the fence surface plane.

A55. The bevel saw of any of paragraphs A46-A54, wherein the gap adjustment mechanism is configured to concurrently rotate both the second fence region rotary element and a/the first fence region rotary element, optionally responsive to adjustment of the blade bevel angle.

A56. The bevel saw of any of paragraphs A1-A55, wherein the blade bevel angle adjustment mechanism is configured to adjust the blade bevel angle within a/the bevel angle plane that extends at least one of parallel to the Fence surface and perpendicular to the workpiece support surface.

A57. The bevel saw of any of paragraphs A1-A56, wherein the blade bevel angle adjustment mechanism further includes a bevel adjustment lock configured to be selectively transitioned between an unlocked state, in which the bevel adjustment lock permits adjustment of both the blade bevel angle adjustment mechanism and the gap adjustment mechanism, and a locked state, in which the bevel adjustment lock resists adjustment of both the blade bevel angle adjustment mechanism and the gap adjustment mechanism.

A58. The bevel saw of any of paragraphs A1-A57, wherein the blade bevel angle adjustment mechanism is configured to facilitate manual adjustment of the blade bevel angle by a user of the bevel saw.

A59. The bevel saw of any of paragraphs A1-A58, wherein the blade bevel angle adjustment mechanism includes an electric bevel actuator configured to automatically adjust the blade bevel angle responsive to a user input, and further wherein the gap adjustment mechanism is configured to automatically adjust the blade-receiving gap based, at least in part, on the user input.

A60. The bevel saw of any of paragraphs A1-A59, wherein the assembly attachment structure further includes a blade miter angle adjustment mechanism configured to adjust a/the blade miter angle of the bevel saw blade relative to the workpiece support.

A61. The bevel saw of paragraph A60, wherein the blade miter angle adjustment mechanism is configured to adjust the blade miter angle within a miter angle plane that extends parallel to the workpiece support surface.

A62. The bevel saw of any of paragraphs A1-A61, wherein the assembly attachment structure further includes a user-actuated assembly pivot configured to permit the user-actuated assembly to pivot, relative to the workpiece support, about a pivot axis that extends parallel to a rotational axis of the arbor.

A63. The bevel saw of any of paragraphs A1-A62, wherein the assembly attachment structure further includes a user-actuated assembly linear translation structure configured to permit the user-actuated assembly to translate, relative to the workpiece support, along a linear translation axis that extends parallel to the workpiece support surface.

A64. The bevel saw of any of paragraphs A1-A63, wherein the bevel saw is at least one of:

(i) a stationary bevel saw; and (ii) a semi-stationary bevel saw.

A65. The bevel saw of any of paragraphs A1-A64, wherein the bevel saw includes at least one of:

(i) a miter saw;

(ii) a sliding miter saw; and (iii) a compound miter saw.

A66 The bevel saw of any of paragraphs A1-A65, wherein the bevel saw blade is a circular saw blade.

A67. The bevel saw of any of paragraphs A1-A66, wherein the bevel saw further includes a gripping region configured to be gripped by a user of the bevel saw during operation of the bevel saw to form the bevel cut in the workpiece.

A68. The bevel saw of any of paragraphs A1-A67, wherein the bevel saw further includes a switch configured to be selectively actuated by a user to selectively apply an electric current to at least one other component of the bevel saw.

A69. The bevel saw of any of paragraphs A1-A68, wherein the bevel saw further includes the bevel saw blade, wherein the bevel saw blade is operatively attached to the bevel saw via the arbor.

B1. A method of adjusting a fence of a bevel saw, the method comprising:

changing at least one of a blade bevel angle of the bevel saw and a blade miter angle of the bevel saw; and automatically adjusting a blade-receiving gap of the fence based, at least in part, on the changing.

B2. The method of paragraph B1, wherein the changing includes manually adjusting the at least one of the blade bevel angle and the blade miter angle.

B3. The method of any of paragraphs B1-B2, wherein the bevel saw includes at least one of an electric bevel actuator, which is configured to automatically adjust the blade bevel angle responsive to receipt of a user input, and an electric miter actuator, which is configured to automatically adjust the blade miter angle responsive to receipt of the user input, and further wherein the changing includes automatically changing responsive to receipt of the user input.

B4. The method of any of paragraphs B1-B3, wherein the changing includes actuating a linkage, and further wherein the automatically adjusting is responsive to the actuating.

B5. The method of any of paragraphs B1-B4, wherein the bevel saw includes an electric gap adjustment actuator, and further wherein the automatically adjusting includes automatically adjusting via the electric gap adjustment actuator.

B6. The method of paragraph B5, wherein the automatically adjusting includes automatically adjusting responsive to receipt of a/the user input by the electric gap adjustment actuator.

B7. The method of any of paragraphs B5-B6, wherein the method further includes detecting at least one of the blade bevel angle and the blade miter angle utilizing a blade angle detector of the bevel saw, and further wherein the automatically adjusting is based, at least in part, on the detecting.

B8. The method of any of paragraphs B5-B7, wherein the method further includes detecting a blade-fence distance between a bevel saw blade of the bevel saw and the fence utilizing a blade distance sensor of the bevel saw, and further wherein the automatically adjusting is based, at least in part, on the blade-fence distance.

B9. The method of paragraph B8, wherein the automatically adjusting includes adjusting the blade-fence distance to a desired blade-fence distance.

B10. The method of any of paragraphs B8-B9, wherein the detecting the blade-fence distance includes contacting the blade distance sensor with the bevel saw blade, and further wherein the changing includes retracting the blade distance sensor from the bevel saw blade such that the blade-fence distance is a/the desired blade-fence distance.

B11. The method of any of paragraphs B1-B10, wherein the bevel saw includes any suitable structure of any of the bevel saws of any of paragraphs A1-A69.

INDUSTRIAL APPLICABILITY

The bevel saws and methods disclosed herein are applicable to the power tool industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A bevel saw configured to form a bevel cut in a workpiece, the bevel saw comprising:

a workpiece support that defines a workpiece support surface configured to support a first side of the workpiece;

a user-actuated assembly that includes a motor having a motor shaft configured to rotate about a shaft rotational axis and an arbor operatively attached to the motor shaft and configured to receive a bevel saw blade;

an assembly attachment structure that operatively attaches the user-actuated assembly to the workpiece support and that is configured to permit constrained motion of the user-actuated assembly relative to the workpiece support surface, the assembly attachment structure including a blade bevel angle adjustment mechanism configured to adjust a blade bevel angle of the bevel saw blade relative to the workpiece support surface; and a fence that defines a fence surface that extends away from the workpiece support surface and that is configured to support a second side of the workpiece, the fence including a first fence region and a second fence region that together define a blade-receiving gap configured to receive the bevel saw blade during operative use of the bevel saw to form the bevel cut in the workpiece, wherein the fence further includes a gap adjustment mechanism configured to adjust the blade-receiving gap based on the blade bevel angle, the gap adjustment mechanism comprising a linkage assembly that includes:

a first linkage member pivotally connected to the first fence region;

a second linkage member pivotally connected to the second fence region;

a third linkage member pivotally connected to lower portions of the first linkage member and the second linkage member; and a fourth linkage member having a slot that receives a pin of the third linkage member, wherein the linkage assembly is operatively connected to the blade bevel angle adjustment mechanism such that adjustment of the blade bevel angle actuates the linkage assembly to adjust the blade-receiving gap.

2. The bevel saw of claim 1, wherein the gap adjustment mechanism is configured to automatically adjust the blade-receiving gap based on the blade bevel angle, and wherein the gap adjustment mechanism further includes an electric gap adjustment actuator operatively coupled to at least one of the first fence region and the second fence region and configured to adjust the blade-receiving gap based on the blade bevel angle.

3. The bevel saw of claim 2, wherein the blade bevel angle adjustment mechanism further includes an electric bevel actuator configured to automatically adjust the blade bevel angle responsive to a user input, and further wherein the gap adjustment mechanism is configured to automatically adjust the blade-receiving gap based on the user input.

4. The bevel saw of claim 1, wherein the gap adjustment mechanism is configured to adjust the blade-receiving gap within a bevel angle plane that extends at least one of parallel to the fence surface and perpendicular to the workpiece support surface, and/or wherein the gap adjustment mechanism is configured to at least one of:

(i) change a shape of the blade-receiving gap; and (ii) change a gap bevel angle of the blade-receiving gap.

5. The bevel saw of claim 1, wherein the linkage assembly is operatively interconnected to the blade bevel angle adjustment mechanism, and further wherein, responsive to adjustment of the blade bevel angle via the blade bevel angle adjustment mechanism, the linkage assembly is configured to apply a motive force that adjusts the blade-receiving gap to a corresponding gap bevel angle.

6. The bevel saw of claim 5, wherein the linkage assembly is configured such that the gap adjustment mechanism automatically adjusts the blade-receiving gap responsive to adjustment of the blade bevel angle by the blade bevel angle adjustment mechanism.

7. The bevel saw of claim 2, further comprising at least one of:

the blade bevel angle adjustment mechanism including at least one first fence region translational element, and further wherein the electric gap adjustment actuator is configured to operatively translate the at least one first fence region translational element relative to the workpiece support surface, and the gap adjustment mechanism further including at least one of:

a blade bevel angle detector configured to detect the blade bevel angle and to generate a blade bevel angle output that is indicative of the blade bevel angle, and further wherein the electric gap adjustment actuator is configured to adjust the blade-receiving gap based on the blade bevel angle output, a blade miter angle detector configured to detect a blade miter angle and to generate a blade miter angle output that is indicative of the blade miter angle, and further wherein the electric gap adjustment actuator is configured to adjust the blade-receiving gap based on the blade miter angle output, and a blade distance sensor configured to detect a blade-fence distance between the bevel saw blade and the fence and to generate a blade distance output that is indicative of the distance between the bevel saw blade and the fence, and further wherein the electric gap adjustment actuator is configured to adjust the blade-receiving gap based on the distance between the bevel saw blade and the fence.

8. The bevel saw of claim 1, wherein the fence surface includes a first fence surface, which is defined by the first fence region, and a second fence surface, which is defined by the second fence region.

9. The bevel saw of claim 8, wherein the first fence region includes a plurality of first fence region translational elements configured to operatively translate, relative to the workpiece support surface and responsive to actuation of the blade bevel angle adjustment mechanism, to selectively adjust the blade-receiving gap.

10. The bevel saw of claim 9, wherein the second fence region includes a plurality of second fence region translational elements configured to operatively translate, relative to the workpiece support surface and responsive to actuation of the blade bevel angle adjustment mechanism, to selectively adjust the blade-receiving gap.

11. The bevel saw of claim 10, wherein a second translation axis of the plurality of second fence region translational elements of the second fence region is parallel to a first translation axis of the plurality of first fence region translational elements of the first fence region.

12. The bevel saw of claim 10, wherein the plurality of second fence region translational elements and the plurality of first fence region translational elements are arranged in corresponding translational element pairs, and further wherein the gap adjustment mechanism is configured to at least one of:

(i) translate each corresponding pair in the same direction; and (ii) translate each corresponding pair by the same distance.

13. The bevel saw of claim 10, wherein the gap adjustment mechanism is configured to concurrently translate both the plurality of second fence region translational elements and the plurality of first fence region translational elements.

14. The bevel saw of claim 13, wherein the gap adjustment mechanism further includes an electric gap adjustment actuator, and wherein the plurality of first fence region translational elements and the plurality of second fence region translational elements are translated responsive to actuation of the electric gap adjustment actuator, (i) in the same direction or in opposite directions; and/or (ii) by the same distance or by different distances.

15. The bevel saw of claim 10, wherein the plurality of second fence region translational elements and the plurality of first fence region translational elements are arranged in corresponding translational element pairs, and further wherein the gap adjustment mechanism is configured to:

(i) translate each corresponding pair in the same direction; and (ii) translate each corresponding pair by the same distance.

16. The bevel saw of claim 8, wherein the first fence region includes a first fence region rotary element configured to operatively rotate, relative to the workpiece support surface and responsive to actuation of the blade bevel angle adjustment mechanism, to selectively adjust the blade-receiving gap.

17. The bevel saw of claim 16, wherein the first fence region further includes a first fence region stationary element that is distal the blade-receiving gap relative to the first fence region rotary element, and/or wherein the first fence region rotary element is configured to rotate about a first fence region rotary axis that extends parallel to the workpiece support surface, and/or wherein the first fence region further includes a first pivot configured to facilitate operative rotation of the first fence region rotary element relative to the workpiece support and the first fence region rotary element tapers away from the first pivot within a fence surface plane of the fence, and/or wherein the second fence region includes a second fence region rotary element configured to operatively rotate, relative to the workpiece support surface and responsive to actuation of the blade bevel angle adjustment mechanism, to selectively vary the blade-receiving gap and the gap adjustment mechanism is configured to concurrently rotate both the second fence region rotary element and the first fence region rotary element responsive to adjustment of the blade bevel angle.

18. A method of adjusting a fence of a bevel saw, the method comprising:

providing a bevel saw that includes:

a workpiece support that defines a workpiece support surface configured to support a first side of a workpiece;

a user-actuated assembly that includes a motor having a motor shaft configured to rotate about a shaft rotational axis and an arbor operatively attached to the motor shaft and configured to receive a bevel saw blade;

an assembly attachment structure that operatively attaches the user-actuated assembly to the workpiece support and that is configured to permit constrained motion of the user-actuated assembly relative to the workpiece support surface, the assembly attachment structure including a blade bevel angle adjustment mechanism configured to adjust a blade bevel angle of the bevel saw blade relative to the workpiece support surface; and a fence that defines a fence surface that extends away from the workpiece support surface and that is configured to support a second side of the workpiece, the fence including a first fence region and a second fence region that together define a blade-receiving gap configured to receive the bevel saw blade during operative use of the bevel saw to form a bevel cut in the workpiece, wherein the fence further includes a gap adjustment mechanism configured to adjust the blade-receiving gap based on the blade bevel angle, the gap adjustment mechanism comprising a linkage assembly that includes:

a first linkage member pivotally connected to the first fence region;

a second linkage member pivotally connected to the second fence region;

a third linkage member pivotally connected to lower portions of the first linkage member and the second linkage member; and a fourth linkage member having a slot that receives a pin of the third linkage member, wherein the linkage assembly is operatively connected to the blade bevel angle adjustment mechanism;

adjusting the blade bevel angle of the bevel saw blade relative to the workpiece support surface via the blade bevel angle adjustment mechanism; and actuating the linkage assembly responsive to adjustment of the blade bevel angle via the operative connection between the linkage assembly and the blade bevel angle adjustment mechanism to adjust the blade-receiving gap.

19. The method of claim 18, further comprising automatically adjusting the blade-receiving gap based on the blade bevel angle with an electric gap adjustment actuator operatively coupled to at least one of the first fence region and the second fence region.

20. The method of claim 19, further comprising at least one of:

operatively translating at least one first fence region translational element relative to the workpiece support surface with the electric gap adjustment actuator; and further including at least one of:

detecting the blade bevel angle and generating a blade bevel angle output that is indicative of the blade bevel angle, and adjusting the blade-receiving gap with the electric gap adjustment actuator based on the blade bevel angle output;

detecting a blade miter angle and generating a blade miter angle output that is indicative of the blade miter angle, and adjusting the blade-receiving gap with the electric gap adjustment actuator based on the blade miter angle output; and detecting, with a blade distance sensor, a blade-fence distance between the bevel saw blade and the fence and generating a blade distance output that is indicative of the distance between the bevel saw blade and the fence, and adjusting the blade-receiving gap with the electric gap adjustment actuator based on the distance between the bevel saw blade and the fence.

21. The method of claim 19, further comprising automatically adjusting the blade bevel angle responsive to a user input with an electric bevel actuator, and automatically adjusting the blade-receiving gap based on the user input.

22. The method of claim 18, wherein adjusting the blade-receiving gap includes adjusting the blade-receiving gap within a bevel angle plane that extends at least one of parallel to the fence surface and perpendicular to the workpiece support surface, and/or at least one of:

(i) changing a shape of the blade-receiving gap; and (ii) changing a gap bevel angle of the blade-receiving gap.

23. The method of claim 18, further comprising operatively interconnecting the linkage assembly to the blade bevel angle adjustment mechanism, and, responsive to adjustment of the blade bevel angle via the blade bevel angle adjustment mechanism, applying, with the linkage assembly, a motive force that adjusts the blade-receiving gap to a corresponding gap bevel angle.

24. The method of claim 23, wherein the gap adjustment mechanism automatically adjusts the blade-receiving gap responsive to adjustment of the blade bevel angle by the blade bevel angle adjustment mechanism.

25. The method of claim 18, wherein the fence surface includes a first fence surface defined by the first fence region and a second fence surface defined by the second fence region.

26. The method of claim 25, further comprising operatively translating a plurality of first fence region translational elements relative to the workpiece support surface and responsive to actuation of the blade bevel angle adjustment mechanism to selectively adjust the blade-receiving gap.

27. The method of claim 26, further comprising operatively translating a plurality of second fence region translational elements relative to the workpiece support surface and responsive to actuation of the blade bevel angle adjustment mechanism to selectively adjust the blade-receiving gap.

28. The method of claim 27, wherein a second translation axis of the plurality of second fence region translational elements of the second fence region is parallel to a first translation axis of the plurality of first fence region translational elements of the first fence region.

29. The method of claim 27, wherein the plurality of second fence region translational elements and the plurality of first fence region translational elements are arranged in corresponding translational element pairs, and further comprising at least one of:

(i) translating each corresponding pair in the same direction; and (ii) translating each corresponding pair by the same distance.

30. The method of claim 27, further comprising concurrently translating both the plurality of second fence region translational elements and the plurality of first fence region translational elements.

31. The method of claim 30, further comprising actuating an electric gap adjustment actuator to translate the plurality of first fence region translational elements and the plurality of second fence region translational elements:

(i) in the same direction or in opposite directions; and/or (ii) by the same distance or by different distances.

32. The method of claim 27, wherein the plurality of second fence region translational elements and the plurality of first fence region translational elements are arranged in corresponding translational element pairs, and further comprising:

(i) translating each corresponding pair in the same direction; and (ii) translating each corresponding pair by the same distance.

33. The method of claim 25, further comprising operatively rotating a first fence region rotary element relative to the workpiece support surface and responsive to actuation of the blade bevel angle adjustment mechanism to selectively adjust the blade-receiving gap.

34. The method of claim 33, further comprising at least one of:

providing a first fence region stationary element that is distal the blade-receiving gap relative to the first fence region rotary element;

rotating the first fence region rotary element about a first fence region rotary axis that extends parallel to the workpiece support surface;

providing a first pivot that facilitates operative rotation of the first fence region rotary element relative to the workpiece support, wherein the first fence region rotary element tapers away from the first pivot within a fence surface plane of the fence; and operatively rotating a second fence region rotary element relative to the workpiece support surface and responsive to actuation of the blade bevel angle adjustment mechanism to selectively vary the blade-receiving gap, and concurrently rotating both the second fence region rotary element and the first fence region rotary element responsive to adjustment of the blade bevel angle.

* * * * *